(12) United States Patent
Radford et al.

(10) Patent No.: US 11,130,130 B2
(45) Date of Patent: Sep. 28, 2021

(54) FLUID FLOW DEVICE

(71) Applicant: University of Leeds, Leeds (GB)

(72) Inventors: Sheena Elizabeth Radford, Leeds (GB); Nikil Kapur, Leeds (GB); David John Brockwell, Leeds (GB)

(73) Assignee: University of Leeds, Leeds (GB)

( * ) Notice: Subject to any disclaimer, the term of this patent is extended or adjusted under 35 U.S.C. 154(b) by 233 days.

(21) Appl. No.: 16/482,367

(22) PCT Filed: Feb. 6, 2018

(86) PCT No.: PCT/GB2018/050333
§ 371 (c)(1),
(2) Date: Jul. 31, 2019

(87) PCT Pub. No.: WO2018/142166
PCT Pub. Date: Aug. 9, 2018

(65) Prior Publication Data
US 2020/0023361 A1    Jan. 23, 2020

(30) Foreign Application Priority Data

Feb. 6, 2017    (GB) .................................. 1701946

(51) Int. Cl.
*B01L 3/00* (2006.01)
*G01N 15/00* (2006.01)

(52) U.S. Cl.
CPC ... *B01L 3/502746* (2013.01); *B01L 3/502761* (2013.01); *B01L 3/502776* (2013.01);
(Continued)

(58) Field of Classification Search
CPC ..... B01L 2200/0663; B01L 2400/0487; B01L 2400/086; B01L 3/502746;
(Continued)

(56) References Cited

U.S. PATENT DOCUMENTS 6,696,022 B1   2/2004   Chan et al.
9,289,763 B2 *   3/2016   Berthier ................ B01L 3/5027
2010/0267066 A1   10/2010   Hosokawa et al.

FOREIGN PATENT DOCUMENTS

CN     102350286 A    2/2012
DE   102012206371 A1   10/2013
(Continued)

OTHER PUBLICATIONS

Shui, Lingling et al., "Microfluidic DNA fragmentation for on-chip genomic analysis," Nanotechnology, 2011, 22(49).
(Continued)

*Primary Examiner* — Jennifer Wecker
(74) *Attorney, Agent, or Firm* — Troutman Pepper Hamilton Sanders LLP; Ryan A. Schneider

(57) ABSTRACT

A micro-fluidic flow device and method. The device includes a conduit having an inlet and an outlet distal from the inlet. The conduit further includes a plurality of constrictions each having a reduction in a cross-sectional area of the conduit in a direction from the inlet to the outlet. The constrictions are arranged in series and the reduction in cross-sectional area at each of the constrictions is sufficient to induce extensional flow in a fluid travelling therethrough, such that the maximum strain rate in the extensional flow region is at least 500 s$^{-1}$.

18 Claims, 13 Drawing Sheets

(52) U.S. Cl.
CPC ............... *B01L 2200/0663* (2013.01); *B01L 2400/0487* (2013.01); *B01L 2400/086* (2013.01)

(58) Field of Classification Search
CPC .......... B01L 3/502761; B01L 3/502776; B01F 11/0071; B01F 13/0059; B01F 2215/0436; B01F 5/0644; B01F 5/0655; G01N 15/00; G01N 2015/0038; G01N 2015/0092
See application file for complete search history.

(56) References Cited

FOREIGN PATENT DOCUMENTS

| | | |
|---|---|---|
| EP | 2404674 A1 | 1/2012 |
| EP | 3031518 A1 | 6/2016 |
| GB | 2394912 A | 5/2004 |
| WO | 2016033455 A1 | 3/2016 |
| WO | 2016044710 A1 | 3/2016 |

OTHER PUBLICATIONS

Simon, S. et al., Physical Degradation of Proteins in Well-defined Fluid Flows Studied within a Four-roll Apparatus, Biotechnology Bioengineering, 2011, pp. 2914-2922, 108(12).

European Search Report issued in application No. GB1701946.4 dated Jul. 27, 2017.

International Search Report and Written Opinion issued in application No. PCT/GB2018/050333 dated Apr. 11, 2018.

T-TAS "Automated Microchip Flow Chamber System", Fujimori Kogyo Co., Ltd., 6 pages, Jun. 12, 2014.

\* cited by examiner

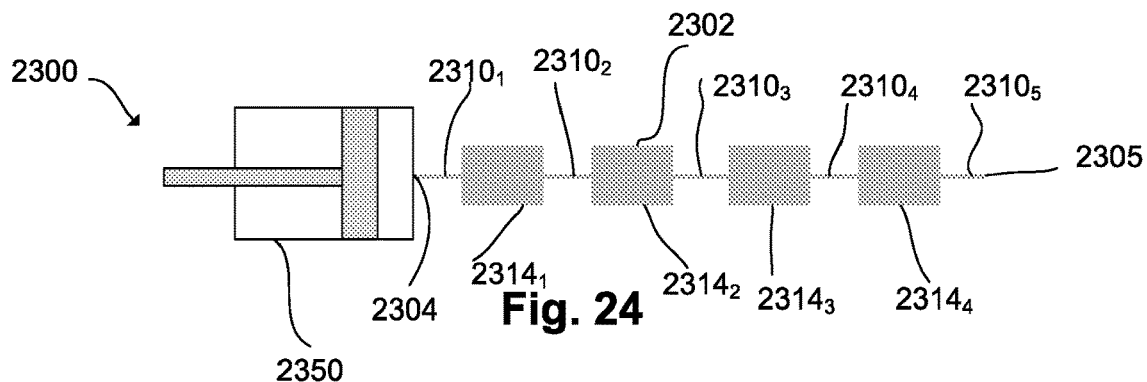
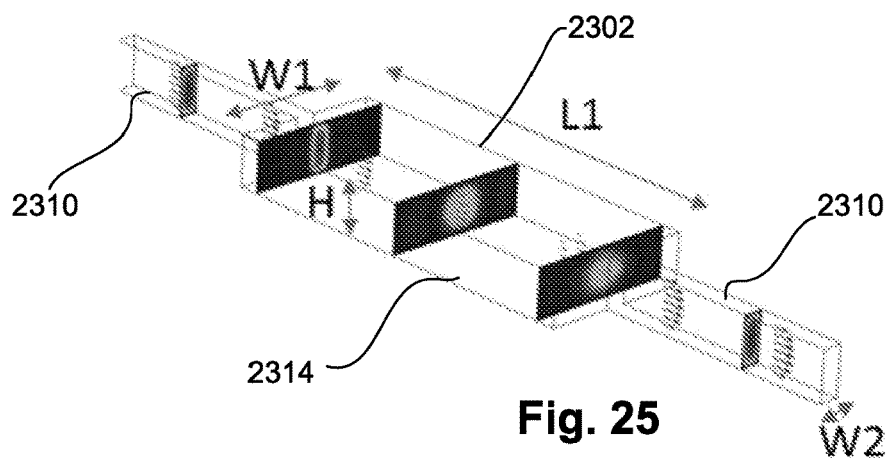
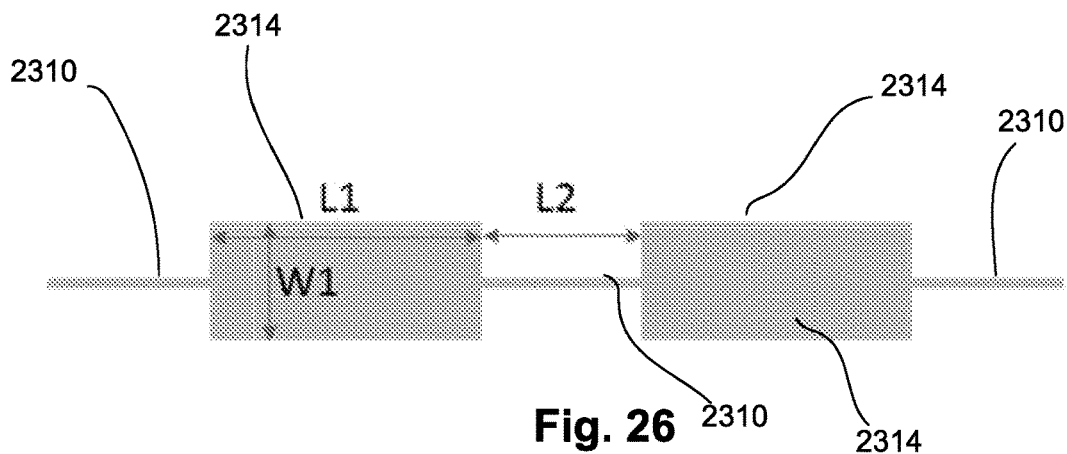
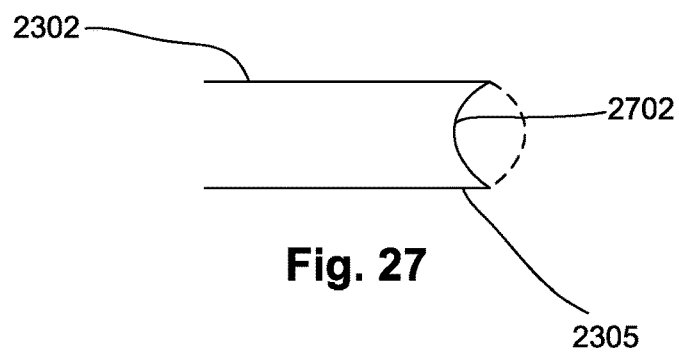

FLUID FLOW DEVICE

The present invention provides a micro-fluidic flow device comprising a plurality of constrictions sufficient to induce extensional flow in a fluid travelling there-through. A system comprising the device and corresponding methods and uses are also provided.

BACKGROUND

Proteins are dynamic and metastable and consequently have conformations that are highly sensitive to the environment. Over the last 50 years the effect of changes in temperature, pH and the concentration of kosmatropic/chaotropic agents on the conformational energy landscape of proteins has become well understood. This, in turn, has allowed a link to be established between the partial or full unfolding of proteins and their propensity to aggregate.

The force applied onto a protein as a consequence of hydrodynamic flow has also been observed to trigger protein aggregation and has fundamental, medical and industrial relevance, especially in the manufacture of bio-pharmaceuticals. While a wealth of studies have been performed, no consensus has emerged on the ability of hydrodynamic flow to induce protein aggregation. This is due to the wide variety of proteins used (ranging from lysozyme, BSA and alcohol dehydrogenase to IgGs), differences in the type of flow field generated (e.g. shear, extensional and turbulent flows or mixtures of these) and to the presence or absence of an interface.

Relative to other extrinsic factors, the effects of hydrodynamic flow fields on protein stability and conformation remain poorly understood. Flow-induced protein remodelling and/or aggregation is observed both in nature and during the large-scale manufacture of proteins, yet the relationships between the type and magnitude of flow, protein structure, stability and aggregation propensity are unclear.

A shearing flow field is caused by a gradient in velocity perpendicular to the direction of travel and is characterized by the shear rate ($s^{-1}$). This results in a weak rotating motion of a protein alongside translation in the direction of the flow. An extensional flow field is generated by a gradient in velocity in the direction of travel and is characterized by the strain rate ($s^{-1}$). A protein in this type of flow would experience an extensional force between the front (faster flow) and the rear (slower flow), potentially leading to elongation of the molecule as directly observed for a single DNA molecule.

The majority of protein aggregation studies to date have considered shear flows within capillaries or through using viscometric type devices. On the whole, these studies show that globular proteins are generally resistant to shear flow in the absence of an interface. More recently, increased aggregation of BSA has been shown with increasing extensional flow (Simon et al. (2011) Physical degradation of proteins in well-defined fluid flows studied within a four-roll apparatus. *Biotechnol. Bioeng.* 108(12):2914-2922). However, the relative importance of shear flow and extensional flow on protein aggregation has not yet been fully elucidated.

During pharmaceutical manufacture, fluids (e.g. pharmaceutical compositions comprising proteins) are subjected to shear flow and extensional flow conditions, which may induce protein aggregation. Devices that mimic these conditions would be useful in predicting the propensity of protein aggregation of such fluids prior to manufacture.

FIG. 1 shows a design of flow apparatus 100. The apparatus 100 includes first and second syringes 102, 104 connected together via a single capillary tube 106. Plungers of each syringe 102, 104 can be pushed towards the capillary tube 106 to force fluid within the syringe backwards and forwards through the capillary tube. In FIG. 1, the arrows indicate the direction of fluid flow from the first syringe 102 to the second syringe 104. As the fluid passes from the first syringe 102 to the capillary, it travels through a constriction in the region 108. Reciprocal motion of the plungers can repeatedly pass the fluid backwards and forwards through the constriction.

The device of FIG. 1 can produce flow conditions analogous to those found in industry. The device can therefore be used to predict the propensity of protein aggregation of fluids (e.g. pharmaceutical compositions comprising proteins) prior to manufacture.

There is a need for alternative and improved devices for predicting the propensity for protein aggregation in fluids such as pharmaceutical compositions comprising proteins.

BRIEF SUMMARY OF THE DISCLOSURE

The inventors have used the device of FIG. 1 to study the flow conditions that induce protein aggregation. Surprisingly, they have found that extensional flow can trigger the aggregation of BSA (and other proteins) but subsequent shear flow does not necessarily have an effect and that the extent of aggregation is dependent on the total exposure time to extensional flow, the strain rate protein concentration, and residence time.

The inventors have used this knowledge to develop a new device for predicting the propensity for protein aggregation in fluids such as protein-based pharmaceutical compositions. Advantageously, the new device is configured to optimise the relative time the fluid is subjected to extensional flow compared to shear flow. In addition, the new device is configured to minimise the total time for fluid to pass through the device.

Although the device has been used herein to predict protein aggregation, it may equally be used for other purposes, such as studying blood coagulation, polymer solution stability, and assessing emulsions. Details of alternative uses of the device are discussed more fully below.

According to one aspect of the present invention, there is provided a micro-fluidic flow device comprising:
 a conduit comprising:
  an inlet and an outlet distal from the inlet;
  a plurality of constrictions each comprising a reduction in a cross-sectional area of the conduit in a direction from the inlet to the outlet, the constrictions arranged in series, wherein the reduction in cross-sectional area at each of the constrictions is sufficient to induce extensional flow in a fluid travelling therethrough, such that the maximum strain rate in the extensional flow region is at least 500 $s^{-1}$.

Suitably, the strain rate is the strain rate along a centreline of the fluid flow that coincides with the central longitudinal axis of the conduit.

Suitably, the cross-sectional area of the conduit reduces by at least 20% across each of the constrictions to induce extensional flow in a fluid travelling therethrough.

Suitably, the cross-sectional area of the conduit reduces across each of the constrictions by an average change in cross-sectional area per unit length of the conduit of at least 12 $\mu m^2$ per micron.

Suitably, the conduit tapers across each constriction towards a central longitudinal axis of the conduit at an average angle relative to the central longitudinal axis of the conduit of from about 15 to 90 degrees.

Suitably, the conduit tapers across each constriction towards a central longitudinal axis of the conduit and at least a segment of the taper is at an angle relative to the central longitudinal axis of the conduit of from about 85 to 90 degrees.

Suitably, the taper across at least one constriction is parabolic, or square in shape.

Suitably, the angle relative to the central longitudinal axis of the conduit is substantially 90 degrees.

Suitably, the smallest cross-sectional area across the constriction is from about 50 $\mu m^2$ to 0.8 $mm^2$.

Suitably, the conduit comprises a transitional segment between each of the constrictions and wherein the cross-sectional area of the transitional segment increases in the direction from the inlet to the outlet to decelerate the fluid travelling therethrough.

Suitably, the conduit tapers away from the central longitudinal axis of the conduit across each transitional segment at an average angle relative to the central longitudinal axis of the conduit of less than or equal to 90 degrees.

Suitably, the conduit tapers away from the central longitudinal axis of the conduit across each transitional segment at an average angle relative to the central longitudinal axis of the conduit of around 30 degrees.

Suitably, a volume of the conduit between each of the constrictions is sufficient to allow the fluid to decelerate to a velocity that is at least 20% less than the maximum velocity of the fluid through the upstream constriction.

Suitably, the conduit comprises at least 4, or at least 10, or at least 30, or at least 40, or at least 50, or at least 100 constrictions in series.

Suitably, the device may further comprise an expandable vessel fluidly coupled to the outlet of the conduit, the expandable vessel configured to expand in volume to receive fluid exiting the conduit via the outlet.

Suitably, the expandable vessel is configured to contract when fluid in the expandable vessel re-enters the conduit via the outlet.

Suitably, the expandable vessel is a syringe, or a bladder, or a balloon, or a flexible diaphragm.

Suitably, a volume of the expandable vessel in an expanded configuration is greater than or equal to a volume of the conduit.

According to another aspect of the present invention, there is provided a system comprising the device of the invention, further comprising a pumping apparatus for pumping fluid through the conduit from the inlet to the outlet.

Suitably, the device is configured for reciprocal motion of fluid through the conduit.

Suitably, the pumping apparatus is further configured to pump fluid through the conduit from the outlet to the inlet.

According to another aspect of the present invention, there is provided a use of the device or the system of the invention for determining the protein aggregation propensity of a fluid.

According to another aspect of the present invention, there is provided a method of determining the protein aggregation propensity of a fluid, the method comprising:

passing the fluid through a plurality of constrictions in a conduit, each of the constrictions comprising a reduction in cross-sectional area of the conduit sufficient to induce extensional flow in the fluid, such that the maximum strain rate in the extensional flow region is at least 500 $s^{-1}$; and analysing the fluid for the presence of protein aggregation.

Suitably, the device of the invention may be used for carrying out the method of the invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The patent, scientific and technical literature referred to herein establish knowledge that was available to those skilled in the art at the time of filing. The entire disclosures of the issued patents, published and pending patent applications, and other publications that are cited herein are hereby incorporated by reference to the same extent as if each was specifically and individually indicated to be incorporated by reference. In the case of any inconsistencies, the present disclosure will prevail.

Various aspects of the invention are described in further detail below.

BRIEF DESCRIPTION OF THE DRAWINGS

Embodiments of the invention are further described hereinafter with reference to the accompanying drawings, in which:

FIGS. 24 to 26 show an alternative configuration of a fluid flow device; and

FIG. 27 shows an example of an expandable vessel coupled to an end of a conduit.

DETAILED DESCRIPTION

The inventors have assessed the relative importance of extension and shear to flow-induced aggregation by developing low-volume flow devices, characterized using Computational Fluid Dynamics (CFD), which use a rapid constriction to generate an extensional flow field followed by flow within a capillary that generates a shearing flow followed by residence within the reservoir syringes.

Figure 1:
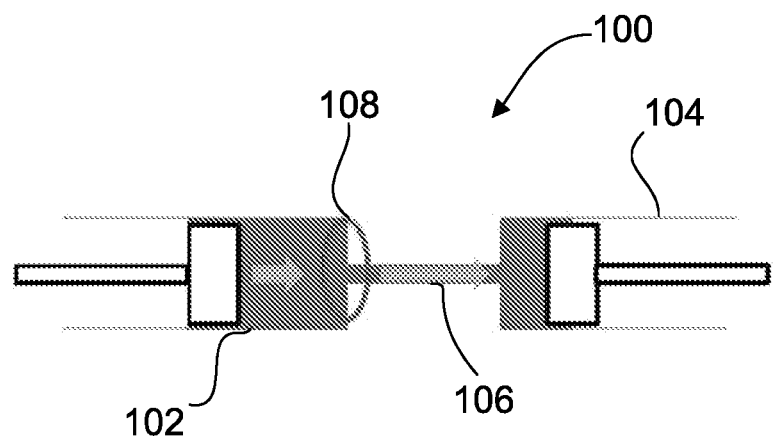
FIG. 1 shows an extensional flow apparatus.

The present inventors have analysed the fluid flow within the device of FIG. 1 and have found that extensional flow can trigger the aggregation of BSA (and other proteins) and that the extent of aggregation is dependent on the total exposure time, strain rate, protein concentration, and residence time (see FIGS. 11 to 14 and 22 to 23).

Figure 2:
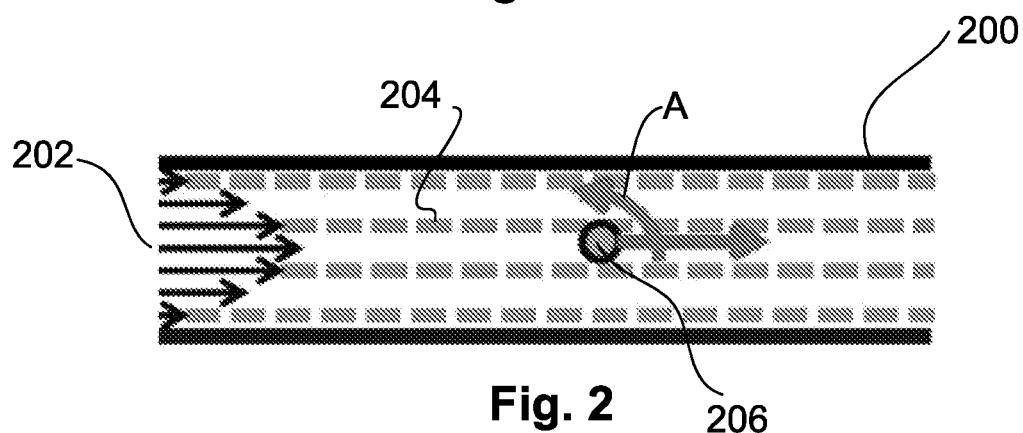
FIG. 2 shows shear flow effects of a fluid.

FIG. 2 shows shear flow effects on a fluid travelling through a conduit 200. Arrows 202 indicate relative velocity of fluid (longer arrows indicative of higher velocity) and dashed lines 204 show streamlines indicative of flow direction. A protein 206 travelling through the conduit 200 experiences shear forces causing a rotation of the protein 206 as indicated by arrow A.

Figure 3:
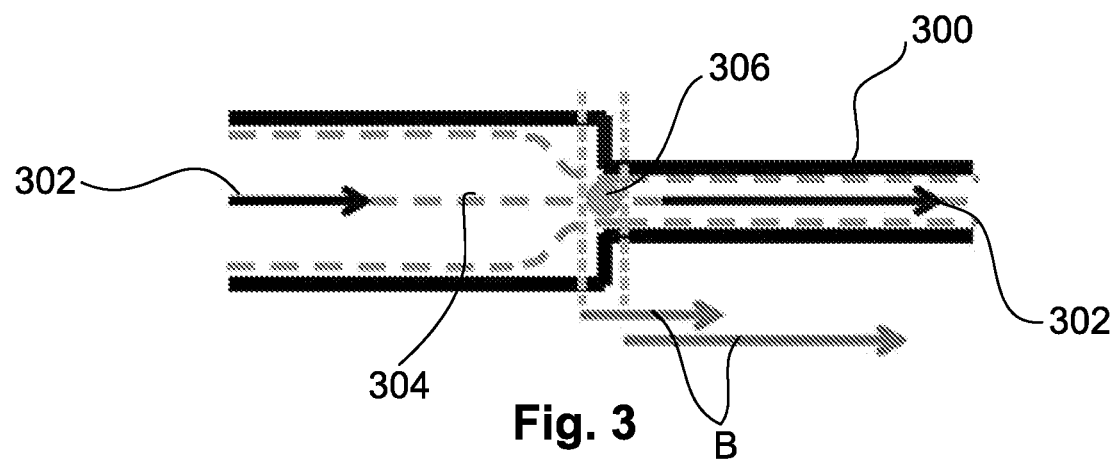
FIG. 3 shows extensional flow effects of a fluid.

FIG. 3 shows extensional flow effects on a fluid travelling through a constriction in a conduit 300 such as the constriction in the region 108 of the apparatus of FIG. 1. Arrows 302 indicate relative velocity of fluid (longer arrows indicative of higher velocity) and dashed lines 304 show streamlines indicative of flow direction. As a protein 306 travelling through the conduit 300 passes the constriction, the protein 306 accelerates through the constriction and experiences extensional flow causing the front of the protein to flow faster relative to the back of the protein. The arrows B indicate the relative velocity of the protein 306 before and after the contraction in which it is subject to extensional flow.

Figure 4:
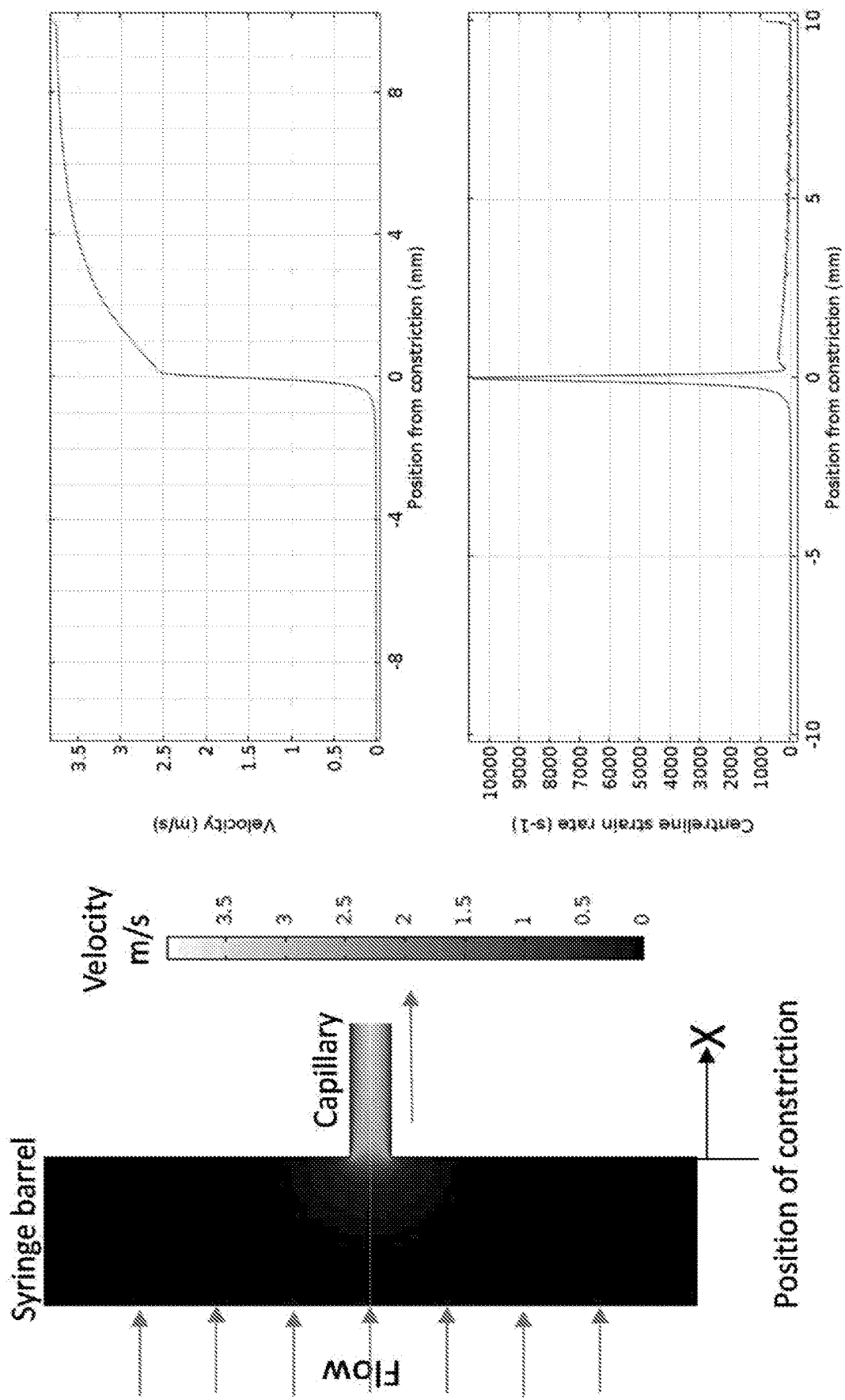
FIG. 4 shows velocity and strain rate of a fluid as it passes a constriction.

FIG. 4 illustrates CFD results of the extensional flow region (e.g. region 108) showing the flow velocity (left) profiles for a typical flow with a plunger velocity (average inlet velocity) of 8 mms$^{-1}$ (centreline strain rate=11750 s$^{-1}$). The lighter regions indicate higher velocity than the darker regions. The line graphs show (top right) velocity and (bottom right) centreline strain rate along the axis of symmetry at a plunger velocity of 8 mms$^{-1}$.

The inventors have also found that the aggregation of a range of globular, natively folded proteins ($\beta_2$m, G-CSF and a mAb) under extensional flow is diverse and is particularly damaging to proteins including therapeutic proteins (e.g. G-CSF and mAbs) under conditions analogous to those encountered during their manufacture (see FIGS. 11 to 14). The inventors have also found that the device of FIG. 1 triggers the aggregation of BSA by inducing partial unfolding and that the extent of aggregation is strain-rate and protein concentration dependent, suggesting that aggregation occurs by interaction of partially unfolded proteins induced by extensional flow.

The inventors have therefore developed an improved device to optimise the relative time the fluid is subject to extensional flow compared to shear flow.

Figure 5:
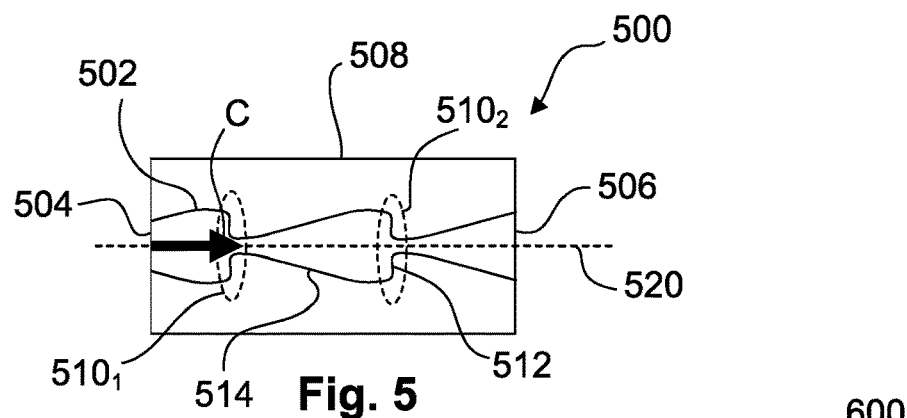
FIG. 5 shows an example of a portion of a fluid flow device.

FIG. 5 illustrates an example of a micro-fluidic flow device 500. As used herein "micro-fluidic flow device" refers to a device having at least one flow channel or conduit with a single dimension of less than 1000 micrometres, wherein the single dimension referred to is the height or width of the conduit, and not its length.

The flow device 500 includes a conduit 502 having an inlet 504 and an outlet 506 distal from the inlet 504. The inlet 504 is an opening at a first end of the conduit 502 and the outlet 506 is an opening at a distal, second end of the conduit 502. The conduit 502 is a continuous fluid flow channel to allow fluid to flow directly through the device from the inlet 504 to the outlet 506.

Fluid may be directed into the conduit 502 at the inlet 504 and passed through the conduit 502 using a suitable pumping device or pumping apparatus. For example, a syringe, an electric fluid pump, or other suitable mechanical pump may be connected to the inlet 504 to pump fluid from a reservoir (e.g. a reservoir in a syringe) through the inlet 504 and along the conduit 502. The arrow C indicates the direction of fluid flow through the device.

In this example, the conduit 502 extends through a micro-chip 508. In this example, the micro-chip 508 is formed through firmly clamping a 50 micron thick polyimide film between a smooth upper and lower plate, with fluid connections made via the upper plate. The conduit 502 is formed in the polyimide film by laser cutting, prior to assembly.

The cross-sectional area of the conduit 502 varies along its length and includes a plurality of constrictions 510. In this example, the conduit includes two constrictions $510_{1\text{-}2}$. Each constriction 510 in the conduit 502 includes a reduction in the cross-sectional area (i.e. the fluid flow area) of the conduit 502 in a direction from the inlet 504 to the outlet 506. In other words, the cross-sectional area of the conduit 510 reduces from a larger cross-sectional area at the upstream side of the constriction (the side of the constriction closest to the inlet 504) to a smaller cross-sectional area at the downstream side of the constriction (the side of the constriction closest to the outlet 506). Each of the constrictions 510 are arranged in series along the conduit 502. That is, the constrictions 510 are arranged in-line along the conduit. In this way, fluid flowing through the conduit will sequentially pass through each of the constrictions 510.

Each of the constrictions 510 is configured so that the reduction in cross-sectional area across the constriction 510 is sufficient to induce extensional flow in a fluid travelling through the constriction 510.

As used herein the term "extensional flow" refers to fluid flow having a gradient in velocity (i.e. acceleration) of the fluid in the direction of travel. During extensional flow, molecules in the fluid experience an extensional force potentially leading to elongation of the molecule in the direction of travel. As used herein, a fluid is said to be under extensional flow conditions when experiencing a strain rate of at least 500 s$^{-1}$.

The strain rate experienced by the fluid is determined by the properties of the fluid, the geometry of the channel and the flow-rate. The strain rate, representing extension within the flow, is computed from the velocity field established using a computational fluid dynamics simulation for a steady, incompressible laminar flow problem, with the dimensions and shape of computational domain to match that of the micro-fluidic device to be used, with periodic in-flow and out-flow boundaries with a pressure differential to create the desired flow rate and fluid properties to match those of the experiment. The strain rate is reported along the centreline of the flow which coincides with the central longitudinal axis (x-direction) of the conduit, and is determined along the centreline by $$\dot{\varepsilon} = \frac{du}{dx}$$

where u is the x-component of velocity and $$\frac{du}{dx}$$

represents the velocity gradient in the direction of flow.

In this example, cross-sectional area of the conduit 502 reduces by around 80% across each constriction 510. The reduction in cross-sectional area of the conduit causes acceleration of the fluid across the constriction, thereby applying an extensional force to the molecules in the fluid. Across each constriction 510 the conduit tapers inwardly toward the central longitudinal axis 520 of the conduit. In other words, walls of the conduit taper towards the central longitudinal axis 520 to thereby reduce the cross-sectional area of the conduit 502.

Across the constriction 510, the cross-sectional area of the conduit reduces relatively rapidly (i.e. sharply) across a relatively short length of the conduit. In this example, the cross-sectional area of the conduit reduces across the constriction by an average of around 500 µm² per µm. In other words, from the largest cross-sectional area of the conduit 502 immediately before (upstream) of the constriction 510, to the smallest cross-sectional area of the conduit 502 immediately after (downstream) of the constriction 510, the average reduction in cross-sectional area is around 500 µm² per µm. In this example, the largest cross-sectional area is just upstream of the constriction (50 micron thickness, 250 micron wide), and the smallest cross-sectional area is at the constriction (50 micron thickness, 60 micron wide), with the reduction taking place over around 5 microns length of conduit.

In this example, the conduit 502 tapers inwardly across the constriction at a non-constant (i.e. non-linear) rate, so that the rate of change of the cross-sectional area per unit length is variable (i.e. not constant). Here, the taper of the conduit 502 across constriction 510 is substantially parabolic in shape. As such, a segment 512 of the constriction 510, includes a more rapid reduction in cross-sectional area of the conduit than the other regions of the constriction. This can help to induce extensional flow by increasing the strain rate in the fluid travelling through the constriction 510. In this example, the segment 512 has a change in cross-sectional area per unit length of around 500 µm² per µm, which is relatively large compared to the average change across the whole constriction.

In this example, at the narrowest point, the constriction 510 has a cross-sectional area of about 3000 µm². The largest cross-sectional area of the conduit 502 (immediately upstream of the constriction) is about 12500 µm².

The conduit 502 further includes a transitional segment 514 between each of the constrictions 510. The transitional segment 514 helps to allow the fluid to decelerate between each of the constrictions 510. In this example, across each transitional segment 514, the cross-sectional area of the conduit 510 increases in a direction from the inlet 504 to the outlet 506. Thus, the cross-sectional area of the conduit 510 in the transitional segment 514 increases in a downstream direction, so that the velocity of the fluid can decrease before passing through the next constriction 510 in the conduit 502.

In this example, across the transitional segment 514, the conduit 502 tapers away from the central longitudinal axis 520 of the conduit at an average angle relative to the central longitudinal axis 520 of around 30 degrees. That is, walls of the conduit 502 taper away from the central longitudinal axis 520 of the conduit at an average angle relative to the central longitudinal axis 520 of around 30 degrees.

Figure 6:
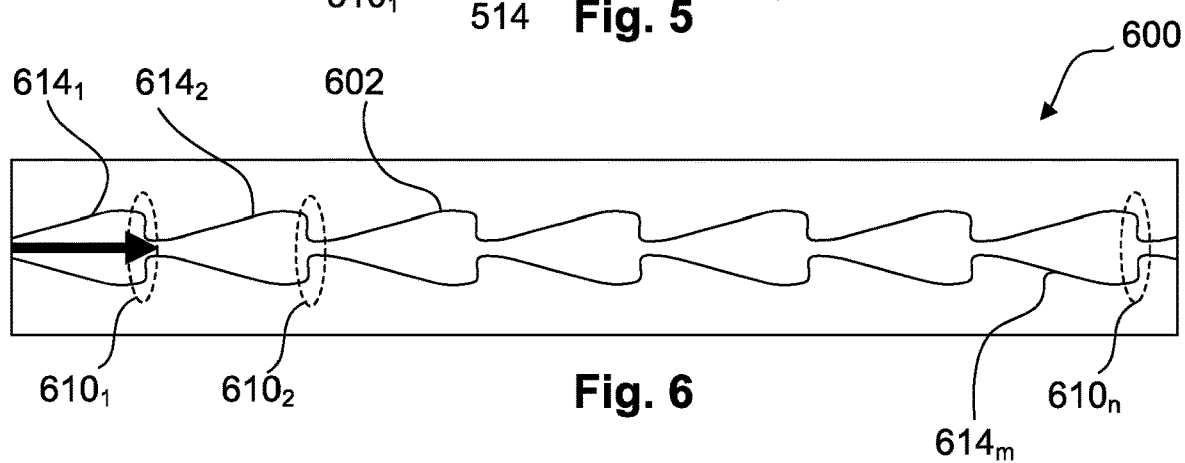
FIG. 6 shows a further example of a portion of a fluid flow device.

FIG. 6 shows a portion of another example of a microfluidic flow device 600. The device is similar to that shown in FIG. 5, but the conduit 602 includes more constrictions $610_{1-n}$. Each of the constrictions 610 and transitional segments $614_{1-m}$ between the constrictions have a similar configuration to that shown in FIG. 5, so will not be described again in detail.

Figure 8:
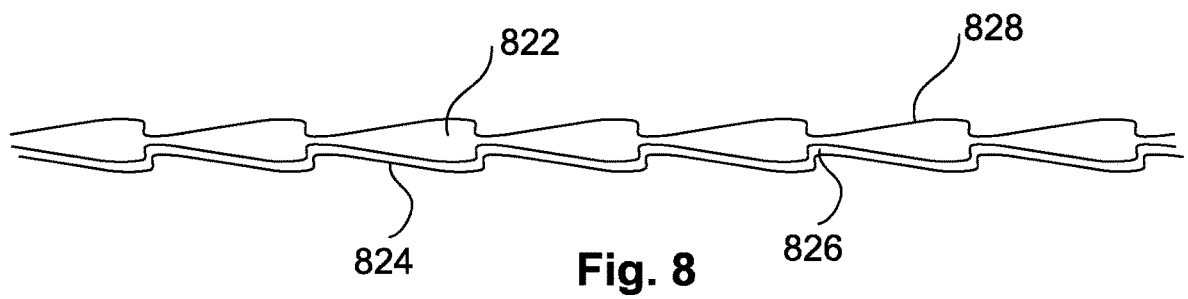
FIG. 8 shows a perspective view of the device of FIG. 6.

FIG. 8 shows a perspective view of the conduit shown in FIG. 6. In this example, the conduit is formed with opposing top and bottom walls 822, 824 that are substantially parallel to each other. The top and bottom walls 822, 824 are joined together by opposing side walls 826, 828. In this example, both of the side walls 826, 828 taper inwardly towards the central longitudinal axis of the conduit at each constriction and taper outwardly away from the central longitudinal axis of the conduit at each transitional segment. In this way, the cross-sectional area of the conduit reduces at each constriction and increases across each transitional segment.

Figure 7:
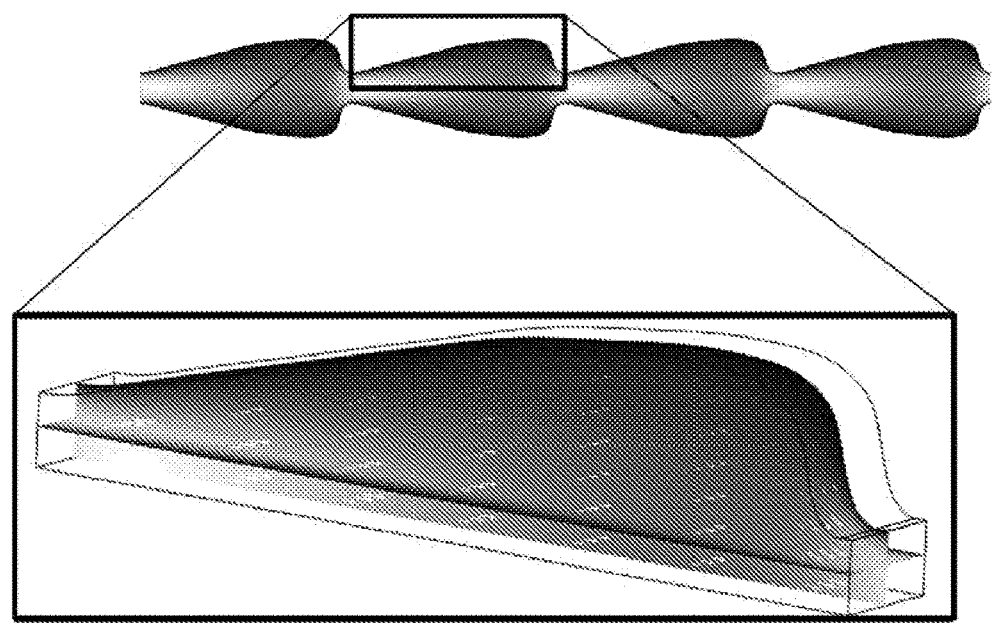
FIG. 7 illustrates the relative velocity of a fluid travelling through the device of FIG. 6.

FIG. 7 illustrates the velocity field of a fluid travelling through a portion of the device shown in FIGS. 6 and 8. The velocity of the fluid varies as it travels along the conduit, wherein extensional flow is induced as the fluid undergoes acceleration. The lighter regions indicate higher velocity than the darker regions.

Figure 9:
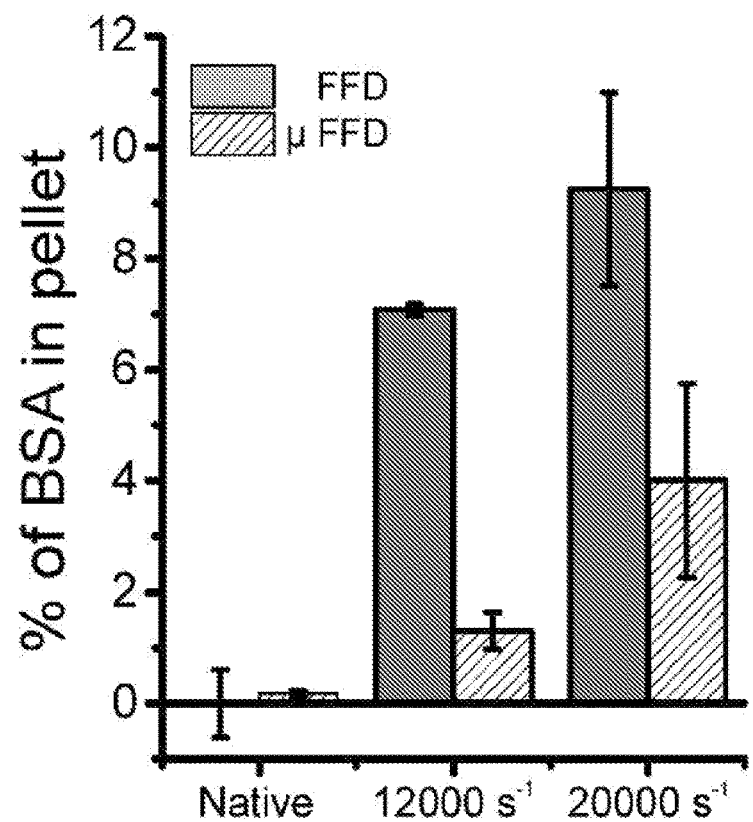
FIG. 9 compares protein aggregation in the device of FIG. 1 (FFD) with the device of FIG. 6 ($\mu$FFD)
Figure 10:
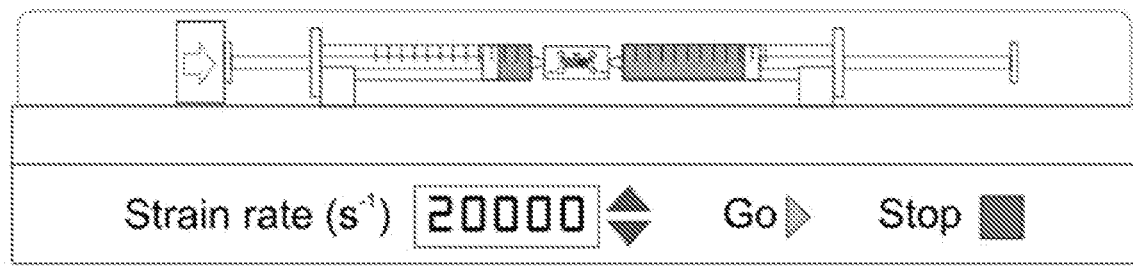
FIG. 10 shows the device of FIG. 6 connected to first and second syringes.

FIG. 9 shows the percentage of protein aggregation observed using the capillary device of FIG. 1 (fluid flow device, FFD) compared to the microfluidic device of FIGS. 6 and 8 (microfluidic flow device, pFFD). The capillary device used included two syringes of 4.61 mm inner diameter with a capillary tube of 0.3 mm inner diameter in between. The end of the capillary tube fits tightly into the syringe, to create a sudden constriction to the flow. The plunger of the syringe initially filled with fluid moves to push fluid through the constriction and into the second syringe. Once the first syringe is empty and the second syringe full, fluid is pushed back from the second syringe to the first. This is repeated to give 100 passes through the constriction. Data reported at a strain rate measured down the long axis of the device of 12000 s$^{-1}$ is achieved using a plunger speed of 8 mm s$^{-1}$. Data reported at a strain rate measured down the long axis of the device of 20000 s$^{-1}$ is achieved using a plunger speed of 14 mm s$^{-1}$. The microfluidic flow device was set up as shown in FIG. 10 fluidly coupled at the inlet and outlet to first and second syringes. The microfluidic device used included 100 constrictions. Fluid was passed from one syringe to the second syringe at a flow rate of 0.1 ml/min to give a centreline strain rate of 12000 s$^{-1}$, or at a flow rate of 0.3 ml/min to give a centreline strain rate of 20000 s$^{-1}$.

In some examples, the probability of protein aggregation may increase by passing the fluid backwards and forwards through the conduit in a reciprocal motion. For example, the device of FIG. 10 including first and second syringes may be used to pass the fluid back and forth through the conduit in reciprocal motion. Each pass of the fluid through the conduit may be defined as a cycle.

Figure 22:
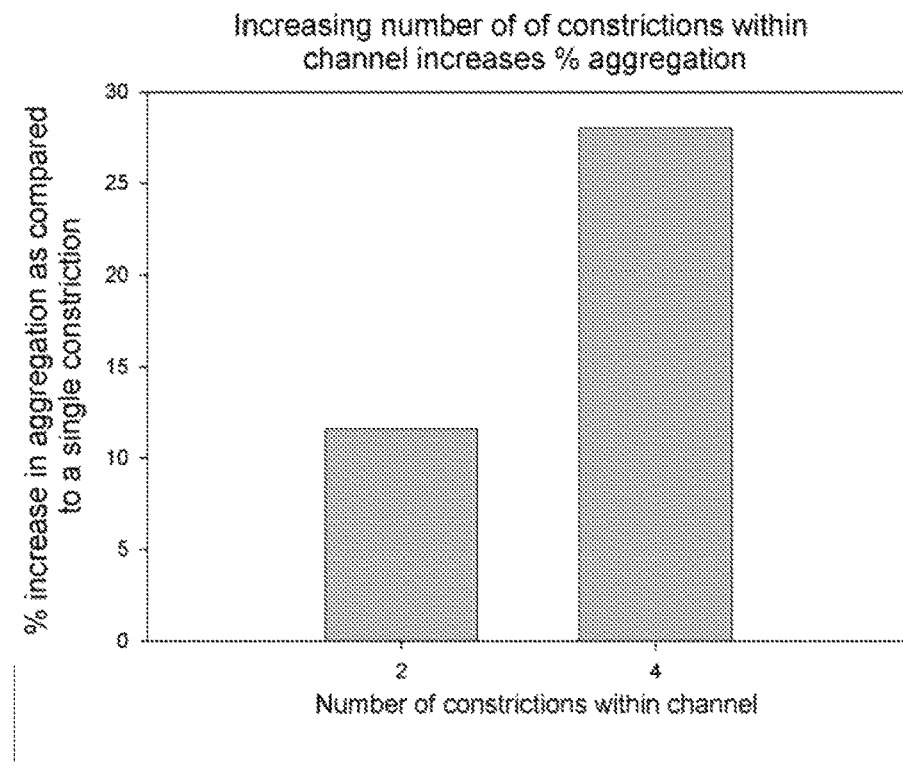
FIG. 22 shows the effects of the number of constrictions on protein aggregation.

FIG. 22 illustrates the percentage increase in protein aggregation after 50 cycles through a fluid flow device including 2, and 4 constrictions relative to a single constriction (50 cycles). As shown, increasing the number of constrictions in the conduit increases the protein aggregation after the same number of cycles.

Figure 23:
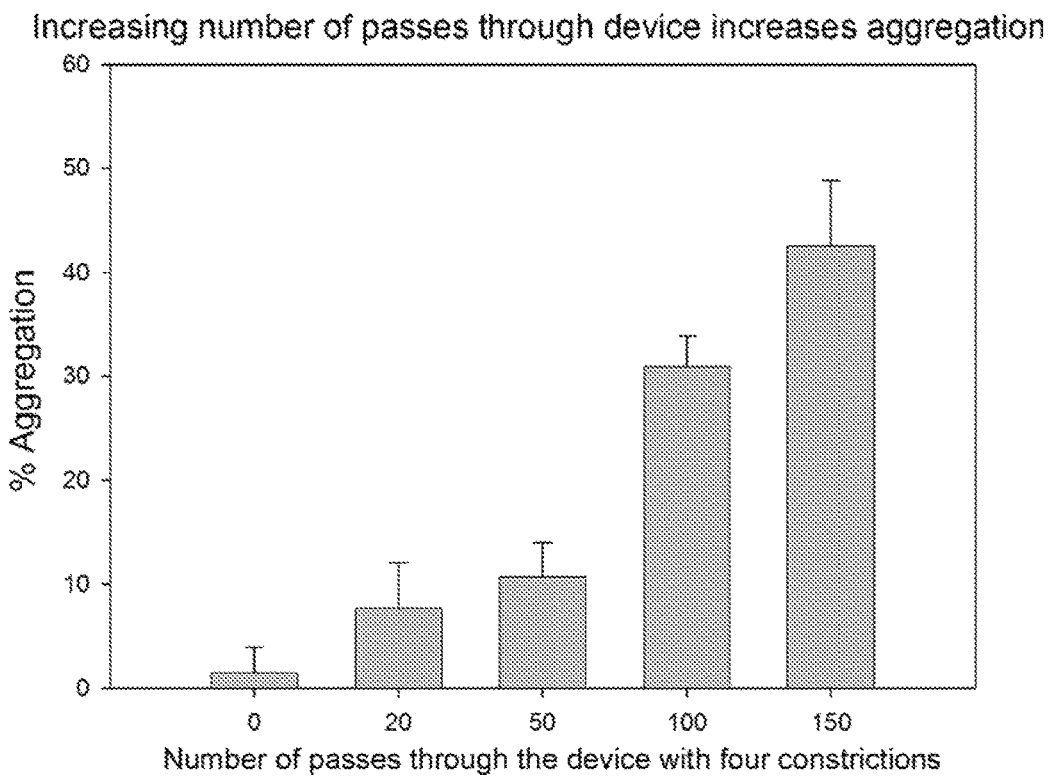
FIG. 23 shows the effects of reciprocation on protein aggregation.

FIG. 23 illustrates the protein aggregation percentage after passing through 80, 200, 400 or 600 constrictions in total, using a device having 4 restrictions. As can be seen, the protein aggregation is more prominent as the number of cycles increases.

As such, as can be seen from both of FIGS. 22 and 23, using a device having a plurality of constrictions and passing the fluid through the device in a reciprocal motion (e.g. using the dual syringe arrangement of FIG. 10), allows for increased protein aggregation propensity in a shorter time period. The present inventors have found that the residence time (i.e. the time the fluid is resident at either end of the device (e.g. in the syringe at each end) allows for increased probability of protein aggregation, whilst the presence of at least two constrictions helps to subject the proteins to an increased number of extensional flow events, which also increases aggregation propensity.

FIG. 24 illustrates an example of a micro-fluidic flow device 2300 suitable for reciprocal motion of a fluid therethrough. The flow device 2300 includes a conduit 2302 having an inlet 2304 and an outlet 2306 distal from the inlet 2304. The inlet 2304 is an opening at a first end of the conduit 2302 and the outlet 2306 is an opening at a distal, second end of the conduit 2302. The conduit 2302 is a continuous fluid flow channel to allow fluid to flow directly through the device from the inlet 2304 to the outlet 2306.

Fluid may be directed into the conduit 2302 at the inlet 2304 and passed through the conduit 502 using a suitable pumping device or pumping apparatus 2350. In this example, the pumping apparatus 2350 is a syringe fluidly coupled to the inlet 2303. The syringe is configured for pumping fluid from the inlet 2304 to the outlet 2306 (i.e. by compressing the plunger towards the inlet) and also is configured for pumping fluid from the outlet 2306 to the inlet 2304 (i.e. by withdrawing the plunger away from the inlet). Thus, the syringe is suitable for providing reciprocal flow of fluid through the conduit 2302. Other pumping apparatus may also be suitable for providing reciprocal flow, for example an electric fluid pump.

The cross-sectional area of the conduit 2302 varies along its length and includes a plurality of constrictions 2310. In this example, the conduit includes five constrictions $2310_{1-5}$. Each constriction 2310 in the conduit 2302 includes a reduction in the cross-sectional area. In this example, each of the constrictions have a length L2 (see FIG. 25) and are of constant cross-sectional area along the length L2. Each of the constrictions 2310 are arranged in series along the conduit 2302. That is, the constrictions 2310 are arranged in-line along the conduit. In this way, fluid flowing through the conduit will sequentially pass through each of the constrictions 2310.

The conduit 2302 further includes a transitional segment 2314 between each of the constrictions 2310. The transitional segment 2314 helps to allow the fluid to decelerate between each of the constrictions 2310. In this example, across each transitional segment 2314, the cross-sectional area of the conduit 2310 is substantially constant.

Each of the constrictions 2310 is configured so that the reduction in cross-sectional area across the constriction 2310 is sufficient to induce extensional flow in a fluid travelling through the constriction 2310.

FIG. 25 illustrates two of the constrictions 2310 as shown in FIG. 24, with a transitional segment 2314 therebetween. In this example, the conduit 2302 has a constant height H along its length, and the cross-sectional area of the conduit 2302 changes by virtue of change in width W of the conduit 2302.

The ratio of the width of the transitional segment 2302 to the width of the constriction 2310 W1:W2 may aptly be from around 2:1 to 15:1, for example around 5:1. It will be appreciated that for a constant height H, the ratio of widths of the transitional segment to width of the constriction is equal to the ratio of cross-sectional area of the transitional segment to cross-sectional area of the constriction.

The height H of the conduit may be selected to allow for desired fluid flow, whilst keeping the volume of the conduit relatively low to avoid the need for large quantities of fluid. For example, the height H of the conduit may be from around 50 µm to around 500 µm, or aptly from around 200 µm to around 300 µm, for example around 250 µm.

The length L1 of the transitional segment may be configured according to the width W1 of the transitional segment. For example, the ratio of the length to the width of the transitional segment L1:W1 may aptly be from around 1:1 to around 15:1. This helps to provide for optimum strain rates in the fluid when passing from the transitional segment 2302 to an adjacent constriction 2310.

The ratio of the length L1 of the transitional segments 2314 to the length L2 of the constrictions 2310 (L1:L2) can depend on the height of the conduit. For a larger height, the length of the constriction may be relatively short. For a smaller height, the length of the constriction may be relatively long. For example, the ratio L1:L2 may be from 1:1000 to 1:5.

It will be appreciated that for a reciprocal fluid flow device the conduit may aptly be configured to have symmetrical constrictions. In other words, the geometry of each constriction in a direction from the inlet to the outlet may be identical to the geometry of the constriction in a direction from the outlet to the inlet. The transitional segments may similarly be configured symmetrically such that the geometry of each transitional segment in a direction from the inlet to the outlet may be identical to the geometry of the transitional segment in a direction from the outlet to the inlet. In this way, the fluid may be subject to the substantially the same forces in both forwards (inlet to outlet) and backwards (outlet to inlet) fluid flow directions. Although in this example, the constrictions and the transitional segments are configured to each be substantially constant width along their respective lengths, it will be appreciated that other symmetrical shapes may be possible (e.g. those shown in FIGS. 16 to 19 and 21).

For a reciprocal fluid flow device, as mentioned above a syringe (or other pumping apparatus) may be provided at both the inlet and the outlet of the conduit. In other examples, similar to that shown in FIG. 24, it may be possible to have a single pumping apparatus 2350 coupled to the inlet. Instead of a further pumping apparatus coupled to the outlet, an expandable vessel 2702 may be coupled to the outlet 2305 (see FIG. 27).

The expandable vessel 2702 is fluidly coupled to the outlet 2305 and is configured to expand in volume to receive fluid exiting the conduit 2302 via the outlet 2305. In other words, as fluid is pumped through the conduit 2302 (via a suitable pumping apparatus), the fluid reaches the end of the conduit 2302 and exits via the outlet 2305 and directly into the expandable vessel 2702. The expandable vessel 2702 is configured to expand to accommodate the increasing volume of fluid as it is pumped out of the conduit 2302.

As the pumping apparatus pumps the fluid back through the conduit from the outlet to the inlet (i.e. in reciprocal motion), the expandable vessel 2702 is configured to contract as the fluid exits the expandable vessel 2702 back into the conduit 2302 via the outlet 2305. As such, the expandable vessel 2702 can help to prevent or reduce air bubbles in the conduit 2302, which can adversely affect fluid flow and possible protein aggregation.

The volume of the expandable vessel in the expanded configuration may be greater than or equal to a total volume of the conduit. This helps to reduce the relative portion of fluid that may become trapped in the conduit between reciprocal cycles. Aptly, the volume of the expandable vessel in the expanded configuration may be at least 2 times greater, or at least 3 times greater than the total volume of conduit.

In this example, the expandable vessel 2702 includes a flexible diaphragm. The solid line indicates the diaphragm in a contracted position (i.e. before expansion). In the contracted configuration, the diaphragm may be substantially concave (in towards the conduit), or in other examples may be substantially flat across the conduit outlet 2305.

As the diaphragm expands towards the expanded configuration, it stretches away from the outlet 2305 of the conduit towards a convex position (out from the conduit), as indicated by the dashed lines in FIG. 27. As such, the volume of the vessel defined by the diaphragm increases to accommodate fluid exiting the outlet. The diaphragm is aptly configured such that the force of the fluid exiting the outlet 2305 is sufficient to stretch the diaphragm to the expanded configuration.

In other examples, the expandable vessel may be configured as a bladder or a balloon, which may stretch to the expanded configuration similarly to the diaphragm described above. In other examples the expandable vessel may be a syringe, in which the vessel expands as the plunger of the syringe moves away from the outlet.

Various modifications to the detailed designs as described above are possible. For example, although in the examples above, the microchip 508 is formed from laser cut polyimide sheet with PMMA forming the top and bottom of the channel, the microchip may alternatively formed from one or more of a plastic, for example polystyrene, polycarbonate, perfluoropolymers, poly-methyl methacrylate, polyester, polyimide, or ceramic, or silicon, or glass, or a metal.

The conduit may alternatively be formed by Injection molding, micro-injection molding, embossing, micromachining, or laser ablating. For example, injection molding could be used to mass-produce the micro-fluidic flow device where pellets of thermosetting plastics are injected under high pressure into a heated molded cavity, before being cooled and the component ejected.

In other examples, rather than forming the conduit in a microchip, the conduit may be formed by casting the conduit into a cylindrical or square cross-section. In this example, the micro-fluidic flow device would not be a substantially flat microchip, but provide similar internal flow characteristics.

The cross-sectional area of the conduit across each constriction may reduce by at least 20% to induce extensional flow in a fluid travelling through the conduit. Aptly, the cross-sectional area of the conduit may reduce by at least 70% or at least 80%. Aptly, the cross-sectional area of the conduit reduces by less than 95% or aptly less than 90%, to help avoid blockages in the conduit. However in some examples it may be possible to reduce the cross-sectional area of the conduit by up to 99.5% at the constriction. For example a conduit having dimensions of 1×1 mm upstream of the constriction, and reducing to 10×10 microns at the constriction would have a 99% reduction in cross-sectional area at the constriction.

In some examples, one or more constrictions along the conduit may include a different reduction in cross-sectional area than other constrictions along the conduit.

The average change of cross-sectional area of the conduit across the constriction may be at least 12 $\mu m^2$ per $\mu m$. The minimum average change may depend on other factors including the velocity at which the fluid is passed, injected or pumped into the device or the composition of the fluid or the proteins in the fluid. For example, injecting a fluid at a higher velocity may allow for less of an average reduction in cross-sectional area of the conduit (i.e. a more gradual reduction in cross-sectional area across the constriction). Alternatively, an increase in the number of constrictions may allow for a lower velocity or smaller change in cross-sectional area, since the relative exposure time of the fluid to extensional flow will increase with increasing number of constrictions.

As described above, each constriction may include a segment having a more rapid reduction in cross-sectional area than other regions of the constriction. The reduction in cross-sectional area of the conduit may occur mostly over the segment. For example, at least 50% of the total reduction in cross-sectional area across the constriction may occur over the segment. Aptly, a segment of the constriction may have an average change in cross-sectional area of the conduit of at least 600 $\mu m^2$ per $\mu m$.

In some examples, the conduit may taper across each constriction towards the central longitudinal axis of the conduit such that the cross-sectional area of the conduit reduces. The taper may be constant or may vary across the constriction. In general, the conduit may taper towards a central longitudinal axis of the conduit at an average angle of around 15 to 90 degrees. In other words, one or more walls of the conduit may taper inwards towards the central axis of the conduit at an average angle of around 15 to 90 degrees. For a 90 degree taper, the constriction is effectively instantaneous so that the walls of the conduit across the constriction extend substantially perpendicular to the longitudinal axis of the conduit and the constriction has a minimal length along the conduit. That is, the angle of the constriction relative to the central longitudinal axis of the conduit is substantially 90 degrees. In some examples, at least a segment of the constriction may be substantially 90 degrees, with other segments of the constriction tapering at an angle less than 90 degrees.

In some examples having a non-constant taper across the constriction, at least a segment of the taper may be at an angle relative to the central longitudinal axis of the conduit of from about 85 to 90 degrees. The segment may form up to 80% of the total length of the taper, or aptly from about 15% to 50% of the total length of the taper.

Aptly, the average taper across each of the constrictions may be around 45 to 90 degrees, or 60 to 80 degrees relative to the central longitudinal axis of the conduit. This can help to induce extensional the flow in a fluid travelling through the conduit whilst minimising the chance of fluid becoming trapped in areas of the conduit immediately upstream of the constriction.

In some examples, the conduit may have a different size cross-sectional area to the examples above. For example, at the largest point or points, the cross-sectional area of the conduit may be from about 125 μm² to 1 mm² whilst at the smallest point across the constrictions, the cross-sectional area may be from about 50 μm² to 0.8 mm². In other words, at the point of largest cross-sectional area or areas the smallest distance across the conduit may be from about 10 microns to 1 mm, whilst at the point of smallest cross section across the constriction the smallest distance across the constriction may be from 5 microns to 900 microns, or around 100 microns for example.

Although the constriction is described above as having a substantially parabolic shape, other shaped constrictions may also be suitable for inducing extensional flow. Similarly the transitional segment may also have a different configuration to the examples described above. For example, other alternative designs are shown in FIGS. 15 to 21.

Figure 15:
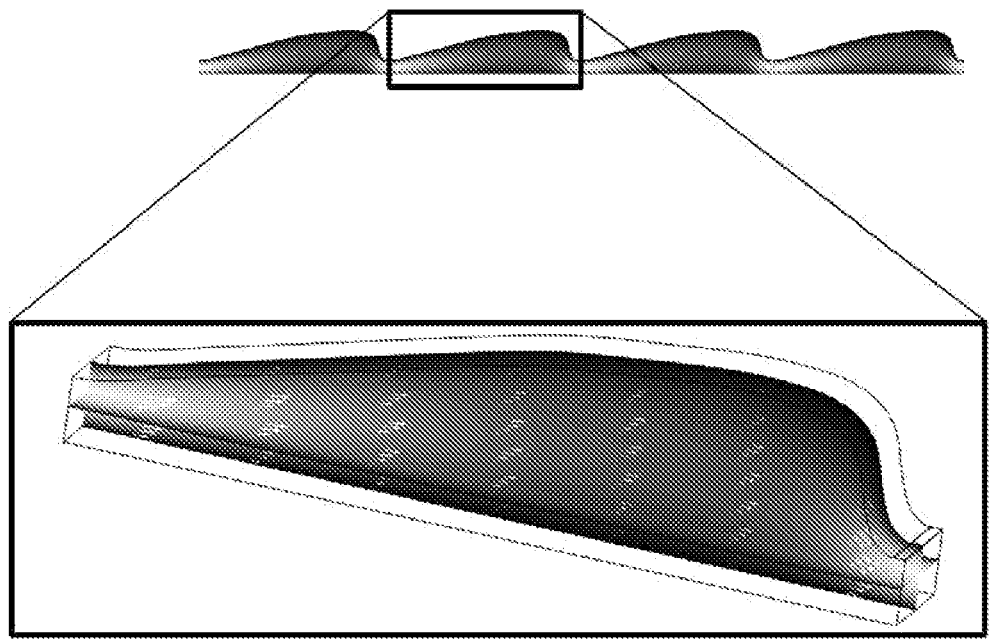
FIGS. 15 to 21 show alternative configurations of a fluid flow device.

FIG. 15 shows an example of a portion of a micro-fluidic flow device having an asymmetric geometry. The device is similar to that shown in FIG. 6, but only one side wall of the conduit tapers inwardly at the constriction, and tapers outwardly across the transitional segment.

Figure 16:
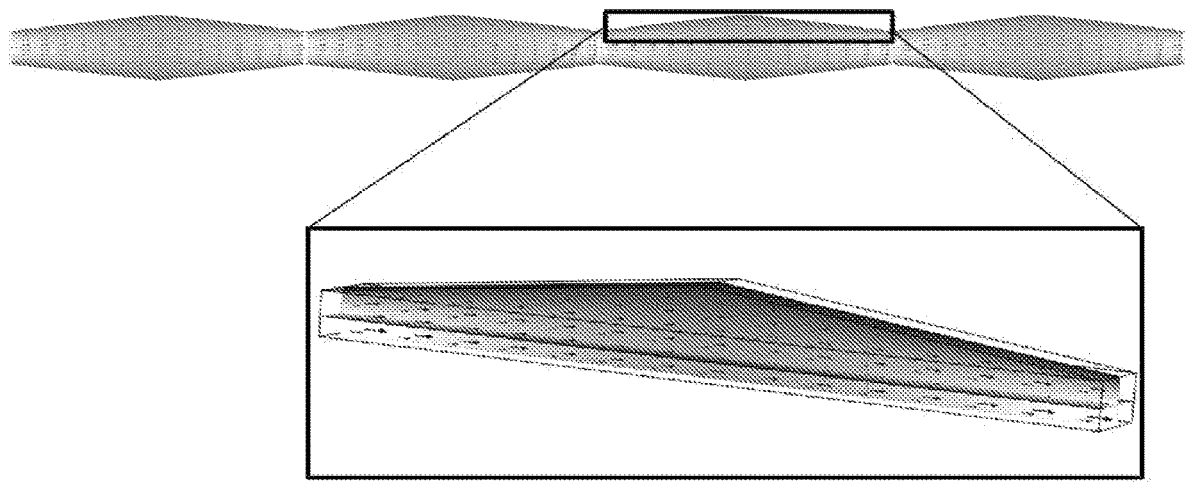

FIG. 16 shows an example of a portion of a micro-fluidic flow device in which each side wall of the conduit has a constant taper. That is, the taper of each side wall is constant, so that the side wall tapers inwards to the narrowest cross-sectional area at the constriction, and tapers outwardly at substantially the same angle towards the largest cross-sectional area at substantially the centre of the transitional segment between constrictions.

Figure 17:
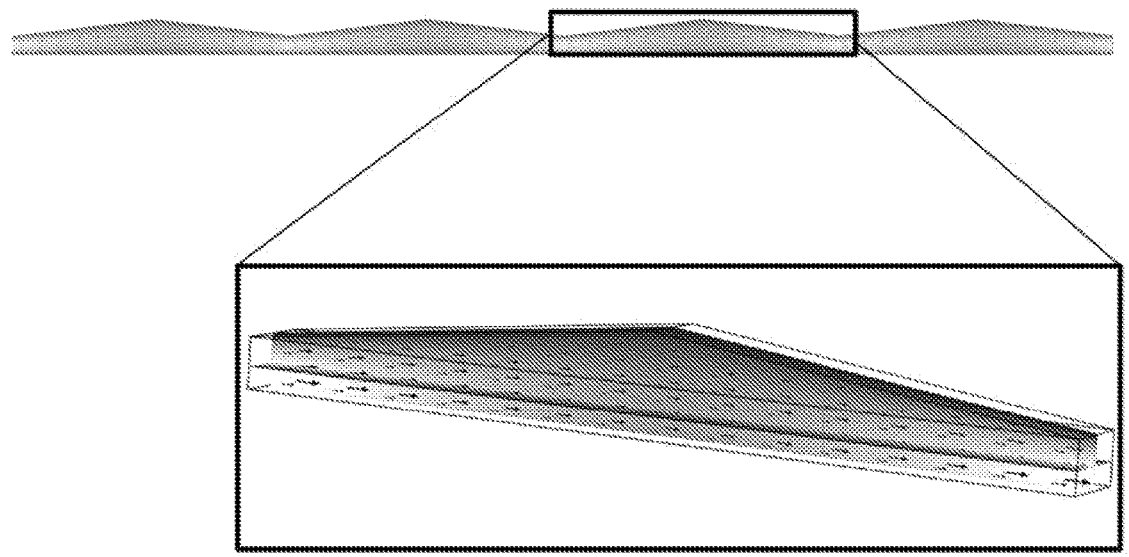

FIG. 17 shows another example of a portion of a micro-fluidic flow device. The device in this example is similar to the device of FIG. 16, but has an asymmetric configuration. As such, only one of the side walls tapers inwardly towards each constriction and tapers outwardly at substantially the same angle towards the largest cross-sectional area at substantially the centre of the transitional segment between constrictions.

Figure 18:
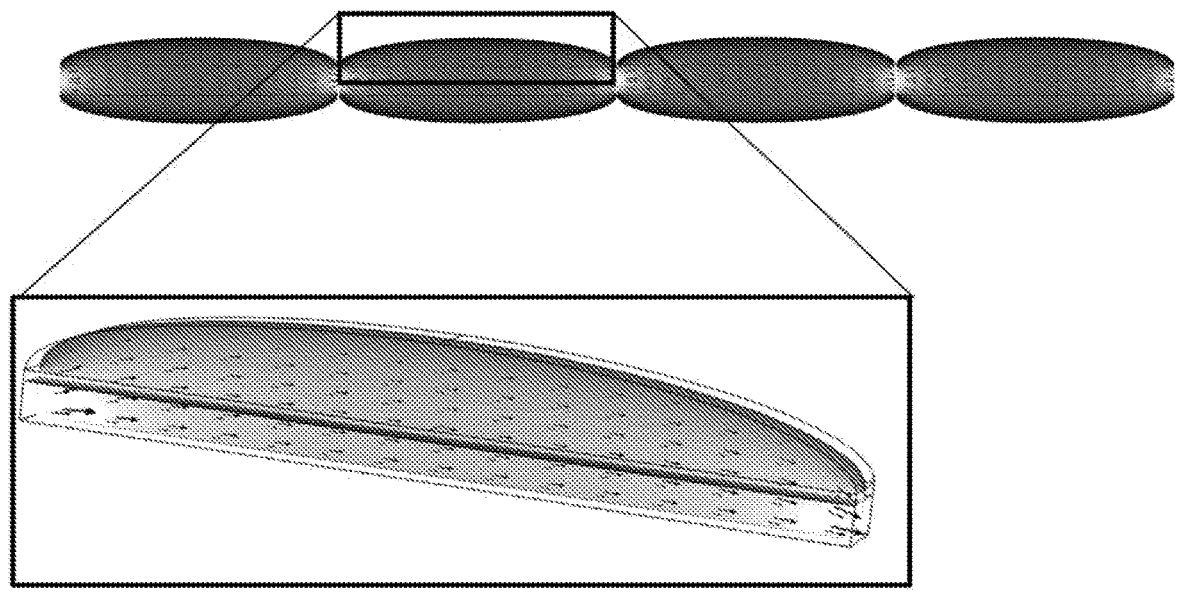

FIG. 18 shows another example of a portion of a micro-fluidic flow device. In this example, the walls of the conduit are substantially arced from a smallest cross-sectional area at the constriction to a largest cross-sectional area at substantially the centre of the transitional segment between constrictions.

Figure 19:
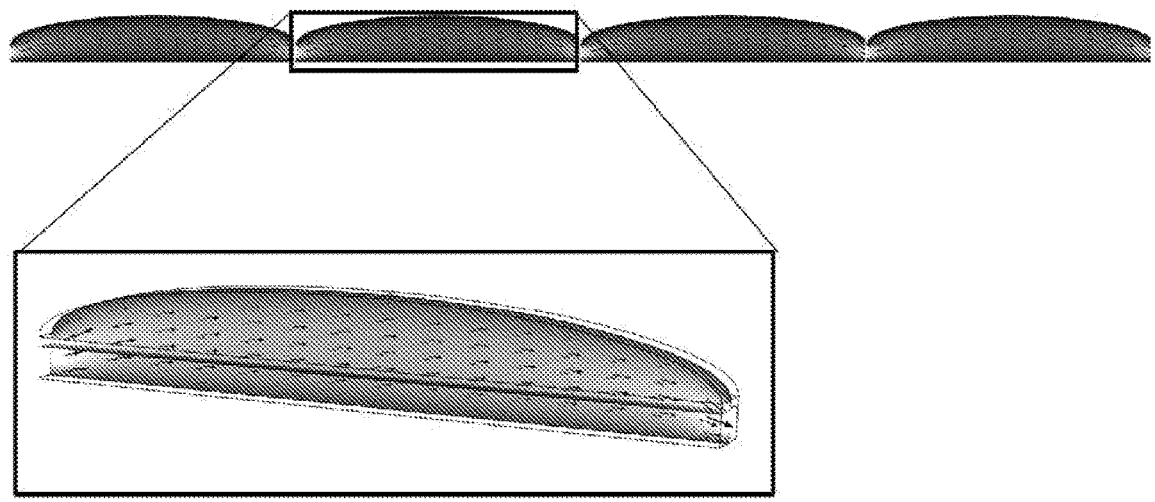

FIG. 19 shows another example of a portion of a micro-fluidic flow device. The device in this example is similar to the device of FIG. 18, but has an asymmetric configuration. As such, only one of the side walls is substantially arced from a smallest cross-sectional area at the constriction to a largest cross-sectional area at substantially the centre of the transitional segment between constrictions.

Figure 20:
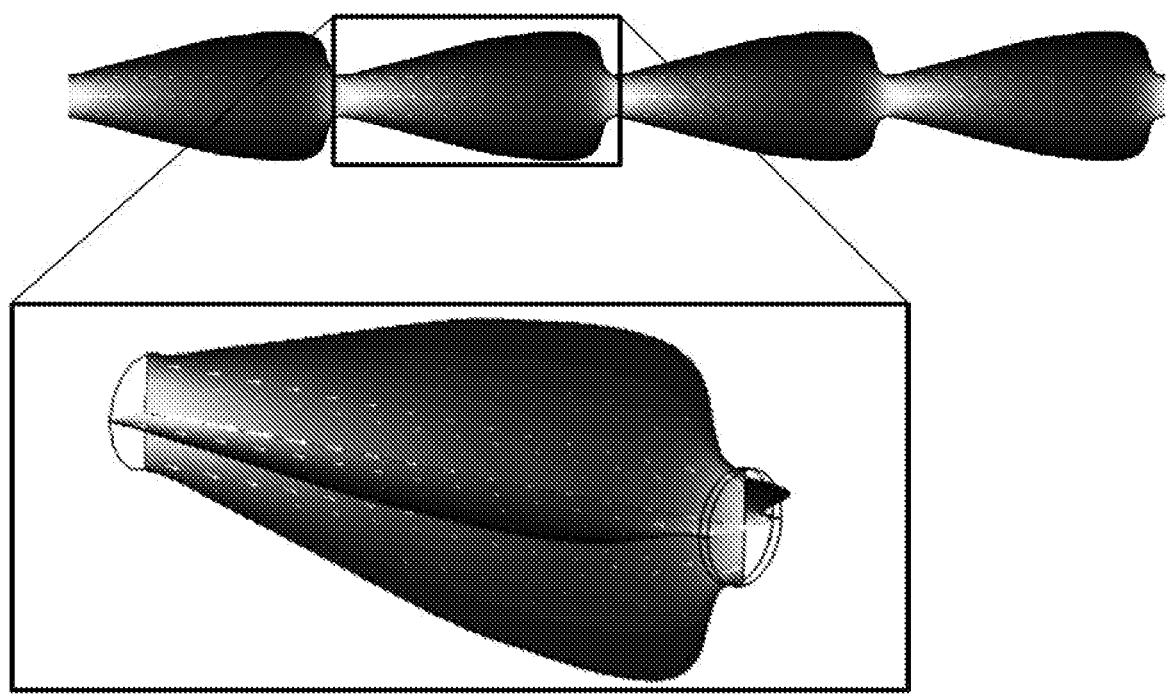

Although in some of the examples described above, the conduit includes opposing top and bottom walls joined by opposing side walls, the conduit may be formed in other suitable ways. For example, the conduit may alternatively be formed from one continuous wall in a substantially cylindrical configuration. In this alternative example, across each constriction, the single wall may taper similarly to the side walls described above, so that e.g. for a constant taper, the conduit is substantially conical in shape across the constriction (as shown in FIG. 20).

Figure 21:
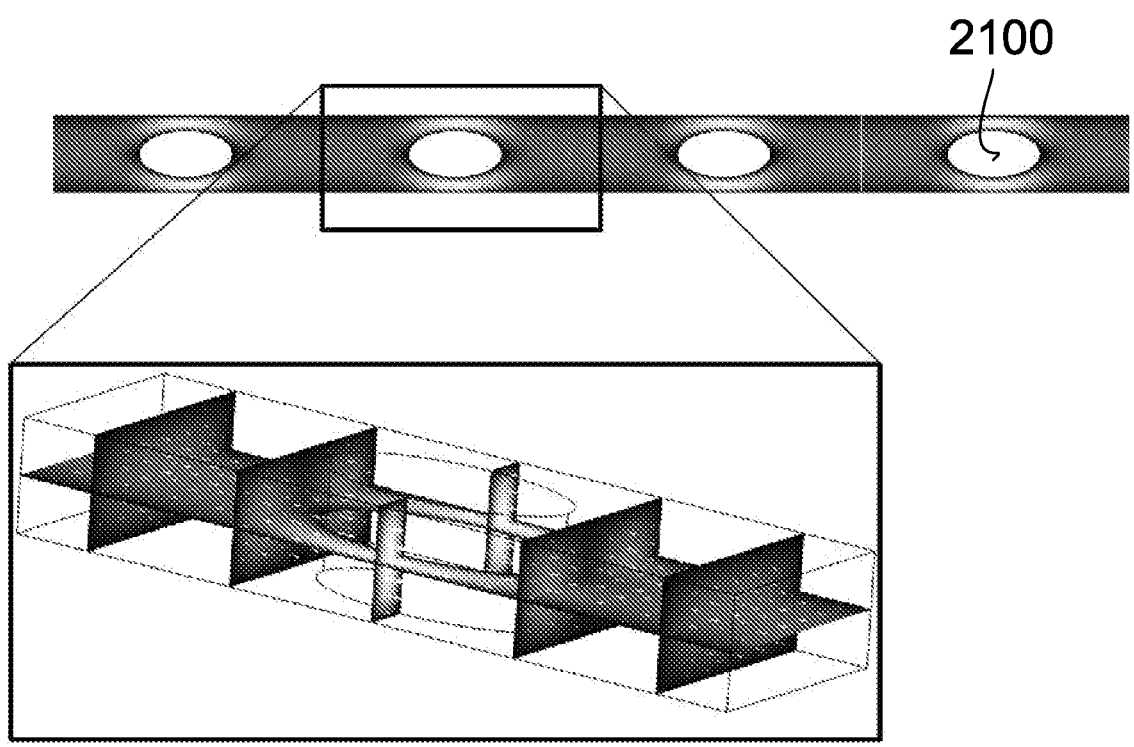

FIG. 21 shows another example of a portion of a micro-fluidic flow device. In this example, an internal obstruction 2100 divides the fluid flow through the conduit to achieve the constriction. The internal obstruction in this example is shown as substantially oval in shape, but other shape obstructions (e.g. square, rectangle, triangle, polygonal, circular, spherical etc.) may also be used to obstruct the conduit to form the constriction in cross-sectional area of the conduit.

FIGS. 5, 6, 8 and 15 to 27 all show examples of a portion of a micro-fluidic flow device. Any number of these portions (or any features of these examples) may be present in any combination within a micro-fluidic flow device.

The maximum height and/or width of the conduit may vary between devices. For example, the maximum height and/or width of the conduit may be around 1 mm. Alternatively, the maximum height and/or width of the conduit may be between around 10 microns and 1 mm.

The transitional segment between each of the constrictions may have a different configuration to the examples described above. The volume of the conduit between each of the constrictions (i.e. the volume of the transitional segment), is aptly large enough and arranged to allow fluid to decelerate to a velocity that is at least 20% less than the maximum velocity of the fluid through the constriction. This allows the fluid to then accelerate and experience extensional flow as it passes through the next constriction.

In some examples, across the transitional segment, the conduit may taper away from the central longitudinal axis of the conduit at an average angle relative to the central longitudinal axis of less than or equal to 90 degrees, such that the cross-sectional area of the conduit increases. Aptly, the conduit may taper away from the central longitudinal axis at an average angle of from 10 to 40 degrees, for example around 30 degrees. Having a relatively gradual taper helps to avoid fluid from becoming trapped in the area immediately downstream of the constriction.

In other examples, the cross-sectional area of the conduit may be constant across the transitional segment. In this way, the cross-sectional area of the conduit may successively reduce across each constriction from the inlet to the outlet.

Although a specific number of constrictions has been illustrated in the example above, the device may include any other number of constrictions. For example, the device may include at least 2, or at least 4, or at least 6, or at least 8, or at least 10, or at least 30, or at least 40, or at least 50, or at least 75, or at least 100 constrictions. The skilled person may select the number of constrictions as appropriate (e.g. based on the specific fluid being used and injection velocity of the fluid into the device). For a reciprocal device (i.e. device for reciprocal fluid flow), it may be beneficial to have from 2 to 50 constrictions, or from 2 to 25 constrictions, or from 2 to 10 constrictions, for example 4 constrictions or 6 constrictions. This can help to provide an increased exposure to extensional flow of the protein yet maintaining residence time, which can increase the probability of protein aggregation.

It will be appreciated that the configuration of the device may vary for different fluids having different fluid properties. For example, when testing a fluid having a relatively high viscosity, a conduit of larger cross-sectional area may be used to reduce the pressure drop and allow for ease of pumping, with a greater flow rate and/or greater percentage reduction in cross-sectional area used to create the effect of extensional flow. Similarly, for a fluid having a relatively high protein concentration (e.g. 250 mg/mL), the percentage reduction in cross-sectional area of the conduit across the constrictions may be smaller than for fluids having a relatively low protein concentration (e.g. 0.5 mg/mL), and still be sufficient to induce the effect of extensional flow in the fluid. Also, a faster flow rate may allow for fewer constrictions and/or a smaller percentage reduction in cross-sectional area across the constrictions, whilst still being sufficient to induce the effect of extensional flow in a fluid travelling therethrough.

The devices described herein may be used to determine the protein aggregation propensity of any fluids. In other words, the device may be used to assess the likelihood of proteins aggregating within the fluid when the fluid is subjected to extensional flow conditions. In this context a fluid may include a biological fluid such as blood, a pharmaceutical composition comprising proteins (e.g. antibody compositions), or other protein compositions or solutions.

Other uses may include analysing the effects of extensional flow on any fluids comprising a protein, a nucleic acid or a combination thereof. Such uses may have utility in assessing the propensity for such protein(s), nucleic acid(s) or combination(s) to aggregate. Suitable fluids may comprise emulsions, polymers, vesicles, encapsulated materials, proteins, nucleic acids bio-inks, enzymes, biological cells, viruses, virus like particles or bacteria. For example, the devices may be used to assess blood coagulation (in the presence or absence of a target anti-coagulation drug), stability of vesicles in solution, stability of encapsulated materials, stability of polymer solutions, buffering solutions for pharmaceutical formulations, conditions for optimum protein stability etc. Specific uses of the device include selecting candidate proteins to take forward to manufacture, assessing in-process conditions (pH, temperature, buffers, etc.), rational redesigning of proteins, and defining most stable buffer formulations.

The fluids may be analysed using techniques known in the art such as centrifugation, mass-spectrometry, pressure measurements, turbidity, Dynamic Light Scattering (DLS), static light scattering, multi-angle light scattering, turbidity, size exclusion chromatography, electron microscopy and Nanoparticle Tracking Analysis (NTA).

The protein aggregation propensity of a fluid may be determined by a method including passing (e.g. pumping or injecting) the fluid through a plurality of constrictions in a conduit (e.g. the conduit of the device of FIG. 6 described above). The fluid may be subsequently analysed for the presence of protein aggregation. The fluid may be passed through any of the devices described above including a conduit with two or more constrictions and may be analysed using any of the techniques described above.

With the above described examples, it is possible to more rapidly assess the effects of extensional flow in a fluid. In particular, the above described device increases the relative time a fluid is subject to extensional flow compared to known devices. This may be particularly useful when assessing the propensity for aggregation in a protein sample.

The above described devices offer a simple method of assessing extensional flow in a fluid. In some examples, fluid can simply be passed once through the device in one direction, mitigating the need for a reciprocal syringe set up (as per the device of FIG. 1). In other examples, the device may be configured for reciprocal fluid flow, exposing the fluid to increased residence time at either end of the conduit. This can help to further increase the probability of protein aggregation.

Production costs associated with the above described devices may be significantly reduced compared to known devices. This has the advantage that the device may be disposable, thus reducing the need for cleaning between uses.

The above described devices can be used with relatively small volumes of fluid. For a protein solution, the device can effectively test the propensity of protein aggregation even with relatively small volumes and with relatively low protein concentrations (e.g. 0.1 mg/ml).

In one example, the micro-fluidic flow device may have a total conduit volume of around 150 microlitres. In this example at least 300 microlitres of fluid may be needed for sufficient analysis. In another example, the micro-fluidic flow device may have a total conduit volume of around 50 microlitres. In this example, at least 200 microlitres of fluid may be needed for sufficient analysis. Aptly, around or at least 500 microlitres of fluid may be used.

Unless defined otherwise herein, all technical and scientific terms used herein have the same meaning as commonly understood by one of ordinary skill in the art to which this invention pertains. For example, Singleton and Sainsbury, Dictionary of Microbiology and Molecular Biology, 2d Ed., John Wiley and Sons, NY (1 94); and Hale and Marham, The Harper Collins Dictionary of Biology, Harper Perennial, NY (1991) provide those of skill in the art with a general dictionary of many of the terms used in the invention. Although any methods and materials similar or equivalent to those described herein find use in the practice of the present invention, the preferred methods and materials are described herein. Accordingly, the terms defined immediately below are more fully described by reference to the Specification as a whole. Also, as used herein, the singular terms "a", "an," and "the" include the plural reference unless the context clearly indicates otherwise. Unless otherwise indicated, nucleic acids are written left to right in 5' to 3' orientation; amino acid sequences are written left to right in amino to carboxy orientation, respectively. It is to be understood that this invention is not limited to the particular methodology, protocols, and reagents described, as these may vary, depending upon the context they are used by those of skill in the art.

Aspects of the invention are demonstrated by the following non-limiting examples.

EXAMPLES

Design and Computational Characterization of Extensional Flow Device

Extensional flow can be generated by methods including a cross-slot, a four-mill-roller, opposed jets, or by introduction of a constriction in a pipe while maintaining laminar flow conditions. The simplicity of the latter method led to the design of a reciprocating flow device (FIG. 1) driven by a stepper motor comprising two gas-tight 1 mL syringes (bore diameter 4.61 mm) connected via a glass capillary (75 mm long, inner diameter 0.3 mm) using compression fittings. The rapid reduction in tube diameter at the square-edged constriction (~15:1) produces a 238-fold increase in linear velocity at each syringe:capillary connection.

Computational Fluid Dynamics (CFD) was then used to characterize the type, magnitude and timescale of the hydrodynamic forces generated by this device. The results from CFD analysis (FIG. 4) show that distal to the constriction, the flow rate is constant (8 mm $s^{-1}$ and 1.9 m $s^{-1}$ at the extremity of each pipe), but increases rapidly (i.e. accelerates) over 2 mm in the vicinity of the constriction (FIG. 4). As the velocities of fluid elements in this region are dependent on their position, the rate of change in their relative position (strain rate, FIG. 4) reaches a maximum as the fluid approaches the narrower section. These data show that as a protein transits a constriction, it will experience high strain effects due to hydrodynamic extensional flow. Repeating CFD using the same geometry but at various inlet velocities (i.e. the velocity at which the plunger moves down the syringe barrel) revealed that the length of the extensional region is independent of the plunger velocity, but that the centreline strain rate is directly dependent on plunger velocity. Additionally, the exposure time of fluid to the high strain regime decreases quadratically with plunger velocity. For simplicity, as the geometry of the device is fixed throughout, we report the plunger velocity and number of passes, allowing recovery of the fundamental fluid mechanical parameters by reference to Table 1.

TABLE 1

Values associated with the experimental flow field. These values are assumed constant unless otherwise stated.

| Entity | Value |
| --- | --- |
| Syringe diameter | 4.61 mm |
| Capillary diameter | 0.3 mm |
| Plunger velocity | 8 mm s$^{-1}$ |
| Velocity in capillary | 1.9 m s$^{-1}$ |
| Volumetric flow rate | 1 mL s$^{-1}$ |
| Reynolds number (syringe) | 37 |
| Reynolds number (capillary) | 570 |
| Centreline strain rate | 11750 s$^{-1}$ |
| Capillary shear rate | 52000 s$^{-1}$ |

Defined Flow Fields can Aggregate BSA

The all α-helical, 583-residue protein BSA (FIG. 11A) was used for our initial studies as it has well-characterized intrinsic aggregation pathways and its behaviour under shear and extensional flow-fields has been investigated previously.

Figure 11:
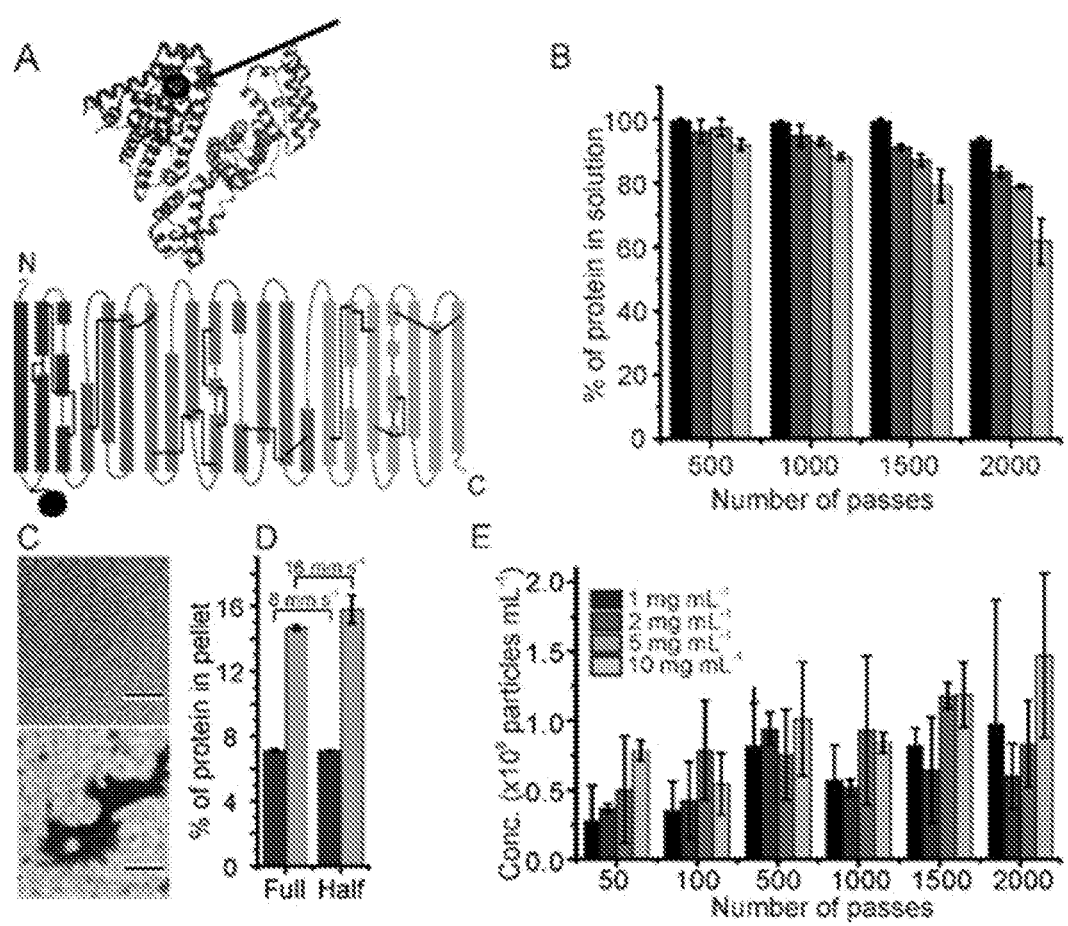
FIG. 11 shows the aggregation of BSA using the device of FIG. 1.

FIG. 11 shows that aggregation of BSA is induced by an extensional flow field. (A) Structure (top, PDB: 3V03 (Mol Immunol. 2012 52:174-82) and topology diagram (bottom) of BSA coloured by domain. The free cysteine is shown as an open circle highlighted by the black arrow (top) and a closed circle (bottom left). (B) Bar graph showing % BSA remaining in solution after 500-2000 passes at 8 mm s$^{-1}$ at a protein concentration of 1 (black), 2 (dark grey), 5 (light grey) or 10 (very light grey) mg mL$^{-1}$. (C) TEM images of 5 mg mL$^{-1}$ BSA after 0 (top) and 2000 passes (bottom). The grids were imaged at 10000× magnification and the scale bar represents 500 nm. (D) Halving the exposure time to shear flow using a 37.5 mm (Half) instead of a 75 mm (Full) connecting capillary has no effect on the extent of aggregation of 5 mg mL$^{-1}$ BSA after 1000 passes at 8 or 100 passes at 16 mm s$^{-1}$. (E) Total number of 10-2000 nm particles tracked by NTA in a 1, 2, 5 and 10 mg mL$^{-1}$ BSA after 50-2000 passes at 8 mm s$^{-1}$.

To assess whether our extensional flow device can induce protein aggregation, 500 μL of gel-filtered mono-disperse BSA at a concentration of 1, 2, 5 or 10 mg mL$^{-1}$ was passed through the capillary 500, 1000, 1500 or 2000 times at a plunger velocity of 8 mm s$^{-1}$ (equivalent to total exposure times to extensional flow of 55, 109, 164 and 218 ms, respectively, at fixed centreline strain rate (11750 s$^{-1}$) and capillary shear rate (52000 s$^{-1}$). The concentration of soluble protein was then quantified after ultra-centrifugation (FIG. 11B) and any aggregates present in the unclarified sample visualized using transmission electron microscopy (TEM) (FIG. 11C). These data show that the designed device can induce protein aggregation, with the amount of insoluble material increasing with increasing pass number in a protein concentration-dependent manner (FIG. 11B, black to very light grey bars). TEM images (FIG. 11C) revealed that the aggregates which form as a result of extensional flow are amorphous in nature and appear denser with increasing pass number.

Figure 12:
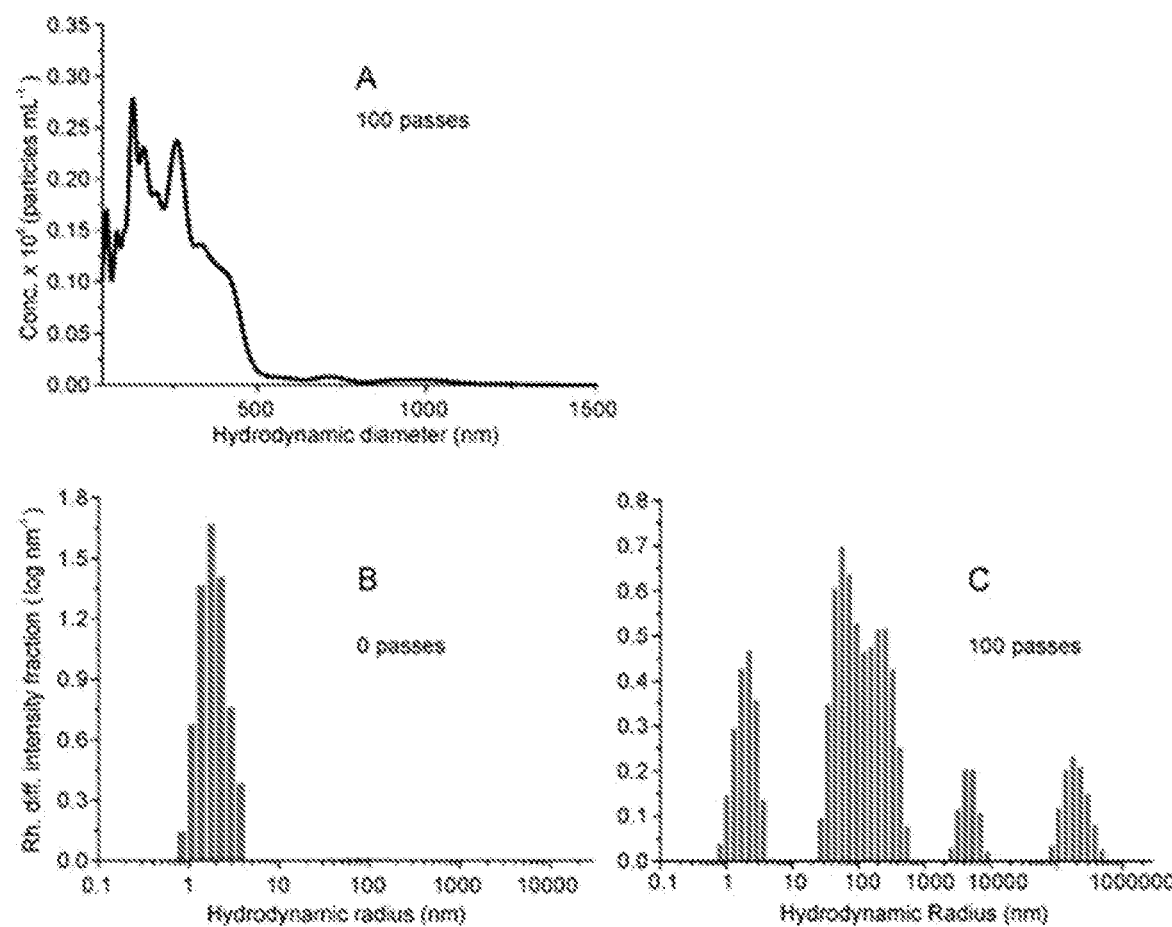
FIG. 12 shows analysis of $\beta_2$m aggregation using the device of FIG. 1.

FIG. 12 shows analysis of extensional flow induced aggregation of 5 mg mL$^{-1}$ β$_2$m by NTA (A) and DLS (B and C) using the device of FIG. 1. (A) NTA of 5 mg mL$^{-1}$ β$_2$m after 100 passes at a plunger velocity of 8 mm s$^{-1}$ (centreline strain rate=11750 s$^{-1}$). Note: no aggregates were visible in the native (0 passes) sample or following 20 passes. (B) DLS regularization plot of native β$_2$m. The peak shows the mean $R_h$=2.5±0.1 nm, a value consistent with that determined using NMR. (C) DLS regularization plot of β$_2$m after 100 passes of extensional flow at a plunger velocity of 8 mm s$^{-1}$ (centreline strain rate=11750 s$^{-1}$). Four distinct peaks were observed from left to right: $R_h$=2.0±0.3, 148±13, 4761±125 and 207662±2261 nm. Cumulants analysis of the DLS data obtained PDI values of 0.21, 0.6 and 0.71 after 0, 20 passes and 100 passes, respectively.

Figure 13:
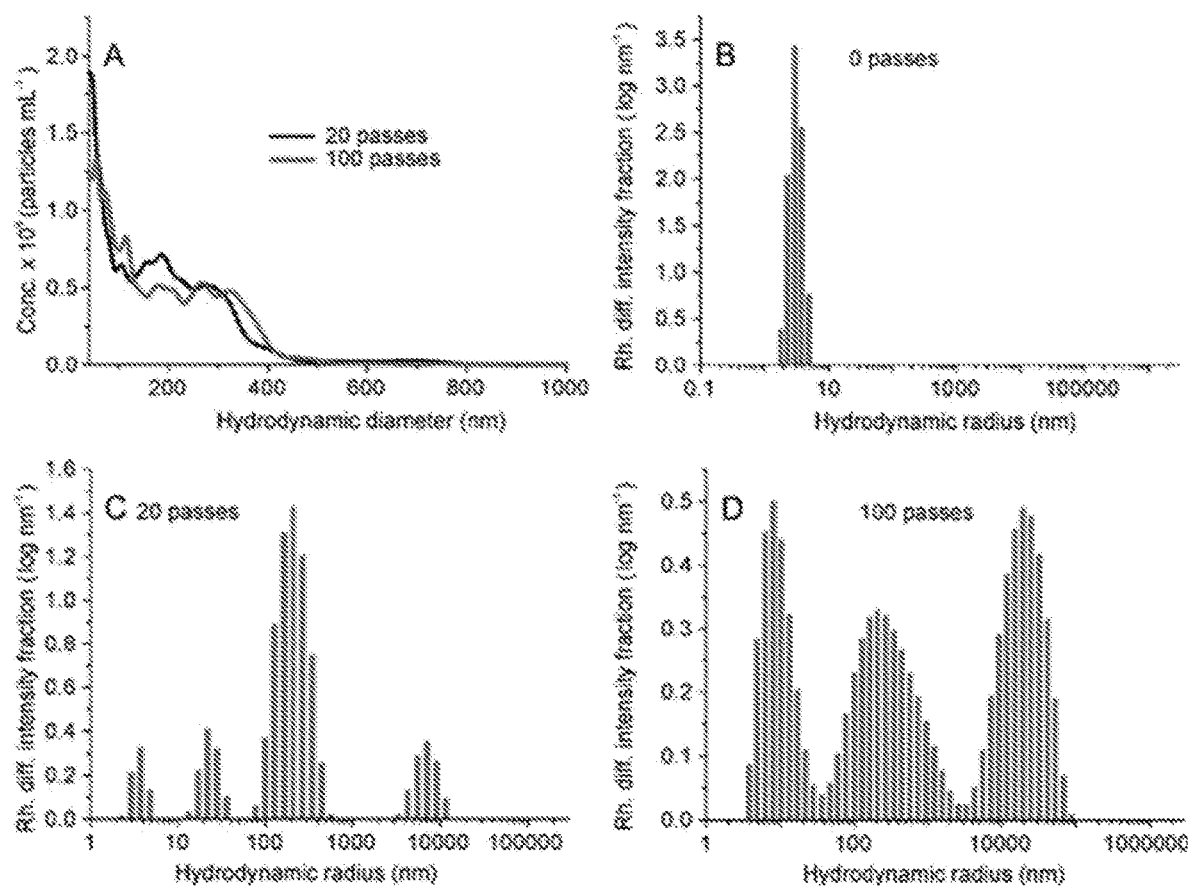
FIG. 13 shows analysis of GCSF-C3 aggregation using the device of FIG. 1.

FIG. 13 shows analysis of extensional flow-induced aggregation of 0.5 mg mL$^{-1}$ GCSF-C3 by NTA (A) and DLS (B-D) using the device of FIG. 1. (A) NTA of GCSF-C3 subjected to extensional flow for 20 or 100 passes at a plunger velocity of 8 mm s$^{-1}$ (centreline strain rate=11750 s$^{-1}$). Note: no particles/aggregates were observed in the native sample (0 passes). (B) DLS regularization plot of native GCSF-C3. A single dominant peak at $R_h$=3.5±0.8 nm is observed. (C) DLS regularization plot of GCSF-C3 after 20 passes at the same velocity as in (A). Four distinct peaks were observed from left to right: $R_h$=3.7±0.2, 24±3, 218±5, and 7091±19 nm. (D) DLS regularization plot of GCSF-C3 after 100 passes. The three apparent peaks observed were merged due to high sample dispersity precluding resolution into discrete peaks, with the mean $R_h$=8750±1400 nm. Cumulants analysis of the DLS data yields PDI values of >0.6 for both the 20 and 100 passes and <0.1 for the native sample (0 passes).

The examples of FIGS. 11 to 14 show that the device of FIG. 1 (or FIG. 6 in the case of FIG. 14) can be used to assess protein aggregation in a variety of different fluids. These examples also show that protein aggregation occurs under extensional flow conditions.

Figure 14:
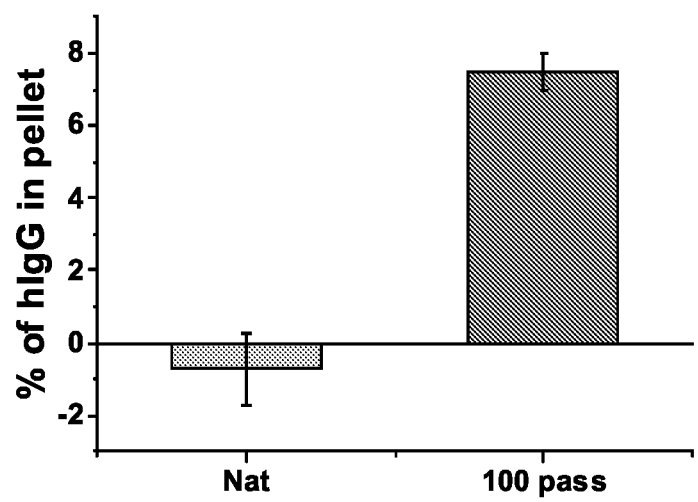
FIG. 14 shows the aggregation of human IgG (hIgG) using the device of FIG. 6.

The example of FIG. 9 shows that the devices described herein can also be used to assess protein aggregation. The inventors compared the device of FIG. 1 (capillary based fluidic flow device (FFD)) and the device of e.g. FIG. 6 (micro-fluidic flow device (pFFD)) and show close agreement in terms of the behaviour as strain rate increased and have also found close agreement in aggregation of IgG using both devices (FIG. 14; hIgG, 100 constrictions at 0.5 ml/min). These comparisons show that both devices can be used to induce extensional flow conditions and predict protein aggregation under these conditions for a number of different protein solutions.

The invention claimed is:
1. A micro-fluidic flow device comprising:
a conduit comprising:
an inlet;
an outlet distal from the inlet;
constrictions, each comprising a reduction in a cross-sectional area of the conduit in a direction from the inlet to the outlet; and
a transitional segment between each of the constrictions;
wherein the constrictions are arranged in series;
wherein the reduction in cross-sectional area at each of the constrictions is sufficient to induce extensional flow in a fluid travelling therethrough, such that a maximum strain rate in an extensional flow region is at least 500 s$^{-1}$;

wherein the cross-sectional area of the conduit reduces by at least 20% across each of the constrictions to induce extensional flow in a fluid travelling therethrough; and wherein the cross-sectional area of each transitional segment increases in the direction from the inlet to the outlet to decelerate a fluid travelling therethrough.

2. The micro-fluidic flow device according to claim 1, wherein the strain rate is the strain rate along a centerline of the fluid flow that coincides with a central longitudinal axis of the conduit.

3. The micro-fluidic flow device according to claim 1, wherein the cross-sectional area of the conduit reduces across each of the constrictions by an average change in cross-sectional area per unit length of the conduit of at least 12 μm² per micron.

4. The micro-fluidic flow device according to claim 1, wherein the conduit tapers across each constriction towards a central longitudinal axis of the conduit at an average angle relative to the central longitudinal axis of the conduit of from about 15 to 90 degrees.

5. The micro-fluidic flow device according to claim 1, wherein the conduit tapers across each constriction towards a central longitudinal axis of the conduit and at least a segment of the taper is at an angle relative to the central longitudinal axis of the conduit of from about 85 to 90 degrees.

6. The micro-fluidic flow device according to claim 4, wherein the taper across at least one constriction is parabolic or square in shape.

7. The micro-fluidic flow device according to claim 1, wherein a smallest cross-sectional area across any one or more of the constrictions is from about 50 μm² to 0.8 mm².

8. The micro-fluidic flow device according to claim 1, wherein the conduit tapers away from a central longitudinal axis of the conduit across each transitional segment at an average angle relative to the central longitudinal axis of the conduit of less than or equal to 90 degrees.

9. The micro-fluidic flow device according to claim 8, wherein the conduit tapers away from the central longitudinal axis of the conduit across each transitional segment at an average angle relative to the central longitudinal axis of the conduit of 30 degrees.

10. The micro-fluidic flow device according to claim 1, wherein the conduit comprises at least 4 constrictions in series.

11. The micro-fluidic flow device according to claim 1 further comprising an expandable vessel fluidly coupled to the outlet of the conduit;

wherein the expandable vessel is configured to expand in volume to receive a fluid exiting the conduit via the outlet.

12. The micro-fluidic flow device according to claim 11, wherein the expandable vessel is configured to contract when a fluid in the expandable vessel re-enters the conduit via the outlet.

13. The micro-fluidic flow device according to claim 11, wherein a volume of the expandable vessel in an expanded configuration is greater than or equal to a volume of the conduit.

14. A system comprising:
the micro-fluidic flow device according to claim 1;
an expandable vessel in fluid communication with the outlet of the conduit; and
a pumping apparatus configured to pump a fluid through the conduit from the inlet to the outlet.

15. The system according to claim 14, wherein the micro-fluidic flow device is configured for reciprocal motion of fluid through the conduit.

16. The system according to claim 15, wherein the pumping apparatus is further configured to pump a fluid through the conduit from the outlet to the inlet.

17. A method comprising:
passing a fluid through the micro-fluidic flow device of claim 1; and
analyzing the fluid.

18. The method according to claim 17, wherein analyzing the fluid comprises analyzing the fluid for the presence of protein aggregation.

* * * * *